(12) United States Patent
Yoshioka et al.

(10) Patent No.: US 12,538,335 B2
(45) Date of Patent: Jan. 27, 2026

(54) TERMINAL AND COMMUNICATION METHOD FOR RESOURCE RESERVATION IN VEHICLE TO EVERYTHING (V2X) COMMUNICATION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 465 days.

(21) Appl. No.: 17/919,885

(22) PCT Filed: Apr. 27, 2020

(86) PCT No.: PCT/JP2020/018051
§ 371 (c)(1),
(2) Date: Oct. 19, 2022

(87) PCT Pub. No.: WO2021/220379
PCT Pub. Date: Nov. 4, 2021

(65) Prior Publication Data
US 2023/0171794 A1    Jun. 1, 2023

(51) Int. Cl.
*H04W 72/40* (2023.01)
(52) U.S. Cl.
CPC .................. *H04W 72/40* (2023.01)
(58) Field of Classification Search
CPC ....... H04W 76/14; H04W 4/40; H04W 72/02; H04W 72/10; H04W 72/56; H04W 76/36; H04W 4/46; H04W 72/20; H04W 72/566; H04W 74/0816; H04W 76/40
See application file for complete search history.

(56) References Cited

U.S. PATENT DOCUMENTS

| | | | | |
|---|---|---|---|---|
| 2019/0059115 A1* | 2/2019 | Uchiyama | ............. | H04W 92/18 |
| 2019/0132832 A1* | 5/2019 | Uchiyama | ............. | H04W 72/56 |
| 2020/0344808 A1* | 10/2020 | Ku | ............. | H04W 4/06 |
| 2021/0204283 A1* | 7/2021 | Zhao | ............. | H04L 1/1812 |
| 2021/0352628 A1* | 11/2021 | Lee | ............. | H04W 76/36 |
| 2023/0180270 A1* | 6/2023 | Liu | ............. | H04W 72/542 370/329 |

FOREIGN PATENT DOCUMENTS

| | | |
|---|---|---|
| WO | 2018/030541 A1 | 2/2018 |
| WO | 2019/187562 A1 | 10/2019 |

OTHER PUBLICATIONS

WO 2020/060276 A1 (Year: 2020).*
WO_2019088779_A1 (Year: 2019).*
WO_2020056608_A1 (Year: 2020).*
(Continued)

*Primary Examiner* — Rushil P. Sampat
(74) *Attorney, Agent, or Firm* — Osha Bergman Watanabe & Burton LLP

(57) ABSTRACT

A terminal includes a receiver that receives, from another terminal, information that is related to inter-terminal direct communication and is for identifying available resources; a controller that identifies candidate resources and selects a resource to be used, based on the information; and a transmitter that performs transmission in the inter-terminal direct communication using the selected resource.

2 Claims, 16 Drawing Sheets

(56) References Cited

OTHER PUBLICATIONS

Office Action issued in Japanese Patent Application No. 2022-518468, mailed on Dec. 5, 2023 (5 pages).
Office Action issued in Chinese Application No. 202080099955.0, mailed Jun. 21, 2024 (16 pages).
International Search Report issued in Application No. PCT/JP2020/018051 mailed on Dec. 15, 2020 (5 pages).
Written Opinion issued in Application No. PCT/JP2020/018051 mailed on Dec. 15, 2020 (3 pages).
3GPP TS 38.211 V16.0.0, "3rd Generation Partnership Project; Technical Specification Group Radio Access Network; NR; Physical channels and modulation (Release 16)", Dec. 2019 (129 pages).
3GPP TR 22.886 V15.1.0, "3rd Generation Partnership Project; Technical Specification Group Services and System Aspects; Study on enhancement of 3GPP Support for 5G V2X Services (Release 15)", Mar. 2017 (58 pages).

* cited by examiner

| PRIORITY LEVEL | gNB/eNB BASED SYNCHRONIZATION |
|---|---|
| P0 | gNB/eNB |
| P1 | UE DIRECTLY SYNCHRONIZED WITH gNB/eNB |
| P2 | UE INDIRECTLY SYNCHRONIZED WITH gNB/eNB |
| P3 | GNSS |
| P4 | UE DIRECTLY SYNCHRONIZED WITH GNSS |
| P5 | UE INDIRECTLY SYNCHRONIZED WITH GNSS |
| P6 | OTHER UE |

HIGH ↔ LOW

TERMINAL AND COMMUNICATION METHOD FOR RESOURCE RESERVATION IN VEHICLE TO EVERYTHING (V2X) COMMUNICATION

TECHNICAL FIELD

The present invention relates to a terminal and a communication method in a radio communication system.

BACKGROUND ART

In Long Term Evolution (LTE) and successor systems of LTE (for example, LTE Advanced (LTE-A) and New Radio (NR) (also called 5G)), a Device to Device (D2D) technology where terminals communicate directly with each other without using a base station is being discussed (e.g., Non-Patent Document 1).

D2D reduces the traffic between terminals and a base station, and enables communications between the terminals even when the base station becomes unable to communicate in the event of a disaster. In 3GPP (Third Generation Partnership Project), D2D is called "sidelink". However, in the present application, D2D, which is a more general term, is used. The term "sidelink" may also be used as needed in the embodiments described later.

D2D is roughly divided into D2D discovery for finding another terminal that is capable of communication and D2D communication (which may also be referred to as "D2D direct communication" or "inter-terminal direct communication") for allowing terminals to directly communicate with each other. In the descriptions below, when it is not necessary to distinguish between D2D communication and D2D discovery, they are simply referred to as D2D. Also, signals transmitted and received in D2D are referred to as "D2D signals". Various use cases of services related to Vehicle to Everything (V2X) in NR are being studied (for example, Non-Patent Document 2).

RELATED-ART DOCUMENTS

Non-Patent Documents

[Non-Patent Document 1] 3GPP TS 38.211 V16.0.0 (2019-12)
[Non-Patent Document 2] 3GPP TR 22.886 V15.1.0 (2017-03)

DISCLOSURE OF INVENTION

Problems to be Solved by the Invention

In the inter-terminal direct communication, it is assumed that a terminal can improve communication quality by receiving information related to, for example, resources to be used from another terminal and by performing, for example, resource selection based on the information. However, the details of information to be shared among terminals and the method of improving the communication quality by using the information are not known.

The present invention is made in view of the above problems, and aims to improve the communication quality, based on information indicated by another terminal in inter-terminal direct communication.

Means for Solving the Problems

An aspect of this disclosure provides a terminal including a receiver that receives, from another terminal, information that is related to inter-terminal direct communication and is for identifying available resources; a controller that identifies candidate resources and selects a resource to be used, based on the information; and a transmitter that performs transmission in the inter-terminal direct communication using the selected resource.

Advantageous Effect of the Invention

This disclosure makes it possible to improve the communication quality, based on information indicated by another terminal in inter-terminal direct communication.

DESCRIPTION OF EMBODIMENTS

Embodiments of the present invention are described below with reference to the accompanying drawings. Embodiments described below are examples, and the present invention is not limited to those embodiments.

In operations of a radio communication system according to an embodiment of the present invention, related-art technologies may also be used as necessary. The related-art technologies are, for example, but are not limited to, existing LTE technologies. Unless otherwise mentioned, the term "LTE" used in the present application has a broad meaning and includes LTE-Advanced, systems subsequent to LTE-Advanced (e.g., NR), and a wireless local area network (LAN).

In the embodiments of the present invention, the duplex method may be a time division duplex (TDD) method, a frequency division duplex (FDD) method, or any other method (for example, a flexible duplex method).

In the embodiments of the present invention, to "configure" radio parameters may indicate that radio parameters are pre-configured using predetermined values, radio parameters are configured to values indicated by a base station 10 or a terminal 20, or radio parameters are predetermined by technical specifications.

Figure 1:
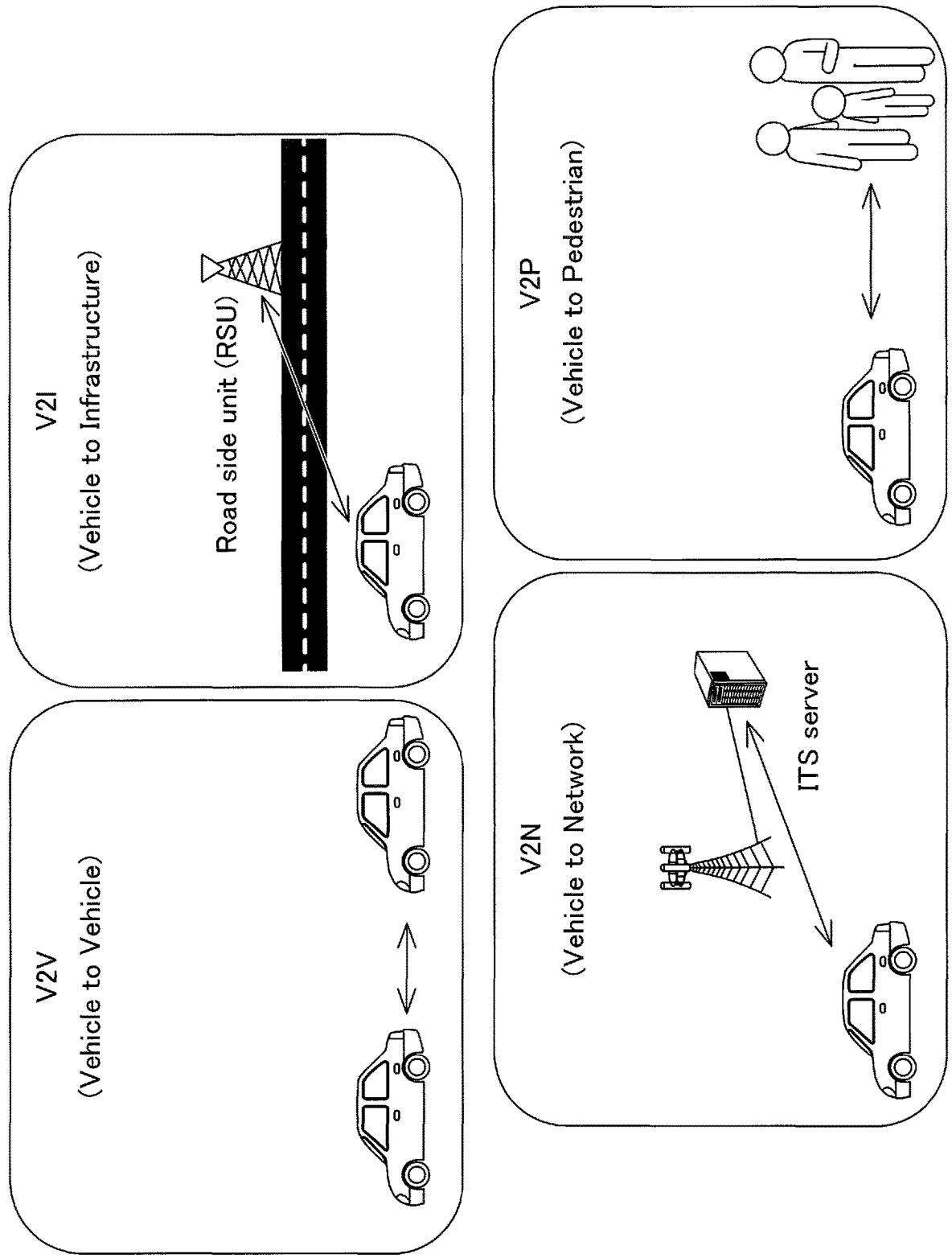
FIG. 1 is a drawing illustrating V2X.

FIG. 1 is a drawing for explaining V2X. In 3GPP, it is being considered to realize V2X (Vehicle to Everything) or eV2X (enhanced V2X) by expanding D2D functions, and relevant technologies are being standardized. As illustrated in FIG. 1, V2X is a part of
Intelligent Transport Systems (ITS) and is a collective term for V2V (Vehicle to Vehicle) indicating communications between vehicles, V2I (Vehicle to Infrastructure) indicating communications between vehicles and road-side units (RSU) installed on the roadside, V2N (Vehicle to Network) indicating communications between vehicles and ITS servers, and V2P (Vehicle to Pedestrian) indicating communications between vehicles and mobile terminals being carried by pedestrians.

Also, in 3GPP, V2X using LTE or NR cellular communications and inter-terminal communications is being studied. V2X using cellular communications is also referred to as cellular V2X. For NR V2X, discussions are being held to realize large capacity, low latency, high reliability, and quality of service (QoS) control.

Regarding LTE or NR V2X, it is expected that discussions not limited to 3GPP technical specifications will be held in the future. For example, it is expected that discussions will be held on interoperability, cost reduction by upper layer implementations, methods of using or switching multiple RATs (Radio Access Technologies), conformance to regulations in respective countries, and data acquisition, distribution, and database management and usage in LTE or NR V2X platform.

In the embodiments of the present invention, it is basically assumed that a communication device is installed in a vehicle. However, the present invention is not limited to the embodiments. For example, a communication device may be a terminal carried by a person, a communication device may be a device installed in a drone or an aircraft, or a communication device may be a base station, an RSU, a relay station (relay node), or a terminal having a scheduling capability. SL (sidelink) may be distinguished from UL (uplink) or DL (downlink), based on one of 1)-4) below or a combination thereof. Also, SL may be referred to as another name.

1) Time domain resource allocation
2) Frequency domain resource allocation
3) Referred synchronization signal (including SLSS (sidelink synchronization signal)
4) Reference signal used for path loss measurement for transmission power control Also, for SL or UL OFDM (Orthogonal Frequency Division Multiplexing), any one of CP-OFDM (Cyclic-Prefix OFDM), DFT-S-OFDM (Discrete Fourier Transform-Spread-OFDM), OFDM without transform precoding, and OFDM with transform precoding may be used.

In LTE SL, Mode 3 and Mode 4 are defined for SL resource allocation to the terminal 20. In Mode 3, transmission resources are dynamically assigned by downlink control information (DCI) transmitted from the base station 10 to the terminal 20. In Mode 3, semi-persistent scheduling (SPS) is also possible. In Mode 4, the terminal 20 autonomously selects transmission resources from a resource pool.

"Slot" in the embodiment of the present invention may be replaced with "symbol", "minislot", "subframe", "radio frame", or "transmission time interval (TTI)". Also, "cell" in the embodiment of the present invention may be replaced with, for example, "cell group", "carrier component", "BWP", "resource pool", "resource", "radio access technology (RAT)", or "system (including wireless LAN)".

In the embodiment of the present invention, the terminal 20 is not limited to a V2X terminal, and may be any type of terminal that performs D2D communications.

For example, the terminal 20 may be a terminal such as a smartphone carried by a user, or an Internet-of-Things (IoT) device such as a smart meter.

Figure 2:
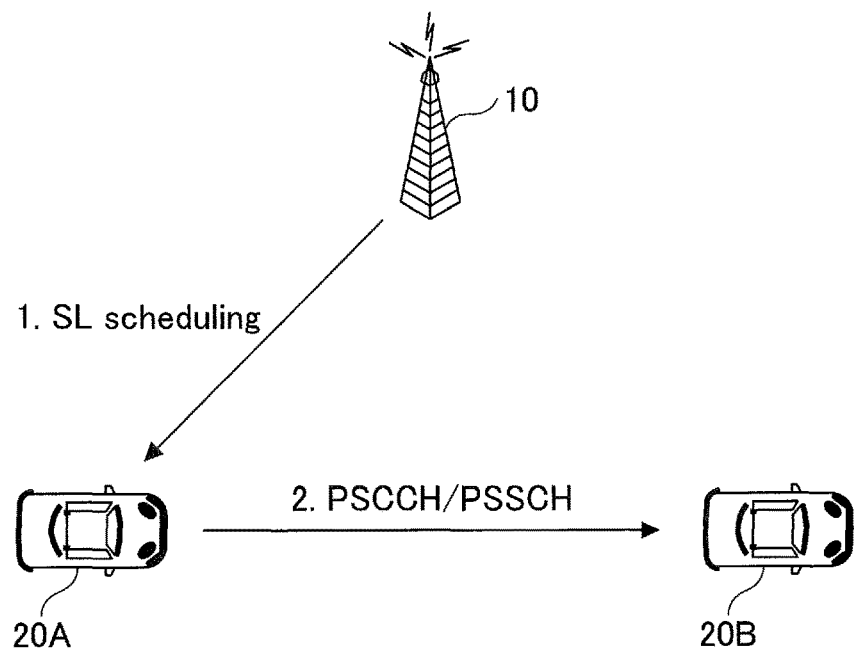
FIG. 2 is a drawing illustrating an example (1) of a transmission mode in V2X.

FIG. 2 is a drawing illustrating an example (1) of a transmission mode in V2X. In a transmission mode in sidelink communication illustrated in FIG. 2, at step 1, the base station 10 transmits sidelink scheduling to a terminal 20A. Next, the terminal 20A transmits PSCCH (Physical Sidelink Control Channel) and PSSCH (Physical Sidelink Shared Channel) to a terminal 20B based on the received scheduling (step 2). The transmission mode in sidelink communication illustrated in FIG. 2 may be referred to as an LTE sidelink transmission mode 3. In the LTE sidelink transmission mode 3, Uu-based sidelink scheduling is performed. Here, Uu indicates a radio interface between UTRAN (Universal Terrestrial Radio Access Network) and user equipment (UE). The transmission mode in sidelink communication illustrated in FIG. 2 may be referred to as an NR sidelink transmission mode 1.

Figure 3:
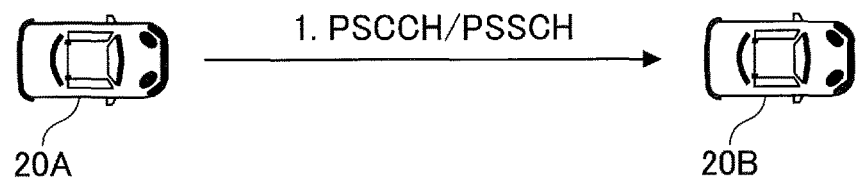
FIG. 3 is a drawing illustrating an example (2) of a transmission mode in V2X.

FIG. 3 is a drawing illustrating an example (2) of a transmission mode in V2X. In a transmission mode in sidelink communication illustrated in FIG. 3, at step 1, the terminal 20A transmits PSCCH and PSSCH to the terminal 20B using autonomously selected resources. The transmission mode in sidelink communication illustrated in FIG. 3 may be referred to as an LTE sidelink transmission mode 4. In the LTE sidelink transmission mode 4, the UE itself performs resource selection.

Figure 4:
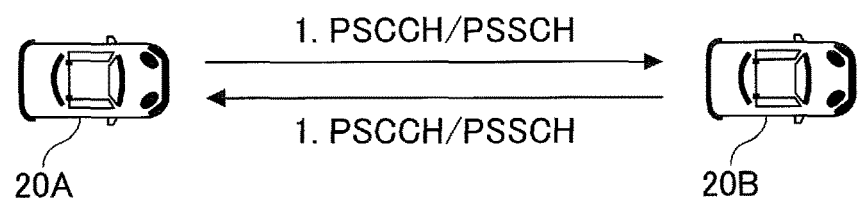
FIG. 4 is a drawing illustrating an example (3) of a transmission mode in V2X.

FIG. 4 is a drawing illustrating an example (3) of a transmission mode in V2X. In a transmission mode in sidelink communication illustrated in FIG. 4, at step 1, the terminal 20A transmits PSCCH and PSSCH to the terminal 20B using autonomously selected resources. Similarly, the terminal 20B transmits PSCCH and PSSCH to the terminal 20A using autonomously selected resources (step 1). The transmission mode in sidelink communication illustrated in FIG. 4 may be referred to as an NR sidelink transmission mode 2*a*. In the NR sidelink transmission mode 2 in NR, the terminal 20 itself performs resource selection. In NR, the mode in which the terminal 20 selects resources and performs sidelink transmission may be referred to as a resource allocation mode 2.

Figure 5:
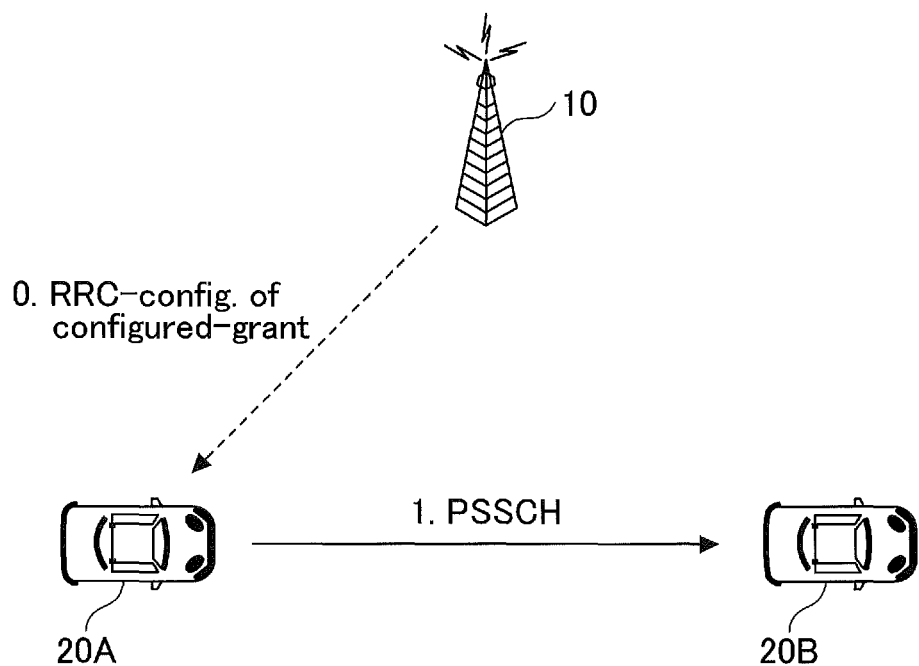
FIG. 5 is a drawing illustrating an example (4) of a transmission mode in V2X.

FIG. 5 is a drawing illustrating an example (4) of a transmission mode in V2X. In a transmission mode in sidelink communication illustrated in FIG. 5, at step 0, the base station 10 transmits a sidelink grant to the terminal 20A via a radio resource control (RRC) configuration. Next, the terminal 20A then transmits PSSCH to the terminal 20B based on a received resource pattern (step 1). The transmission mode in sidelink communication illustrated in FIG. 5 may be referred to as an NR sidelink transmission mode 2*c*.

Figure 6:
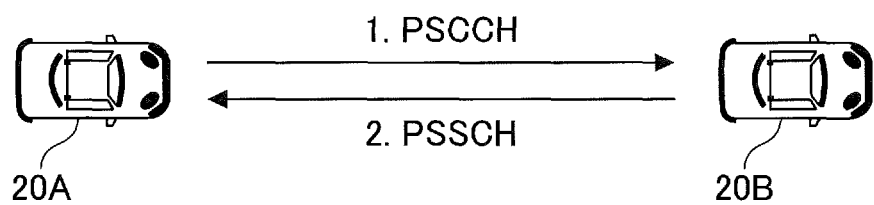
FIG. 6 is a drawing illustrating an example (5) of a transmission mode in V2X.

FIG. 6 is a drawing illustrating an example (5) of a transmission mode in V2X. In a transmission mode in sidelink communication illustrated in FIG. 6, at step 1, the terminal 20A transmits information on sidelink scheduling to the terminal 20B via PSCCH. Next, the terminal 20B transmits PSSCH to the terminal 20A based on the received scheduling (step 2). The transmission mode in sidelink communication illustrated in FIG. 6 may be referred to as an NR sidelink transmission mode 2*d*. In NR, the mode in which the base station 10 assigns resources to the terminal 20 for sidelink transmission may be referred to as a resource allocation mode 1.

Figure 7:
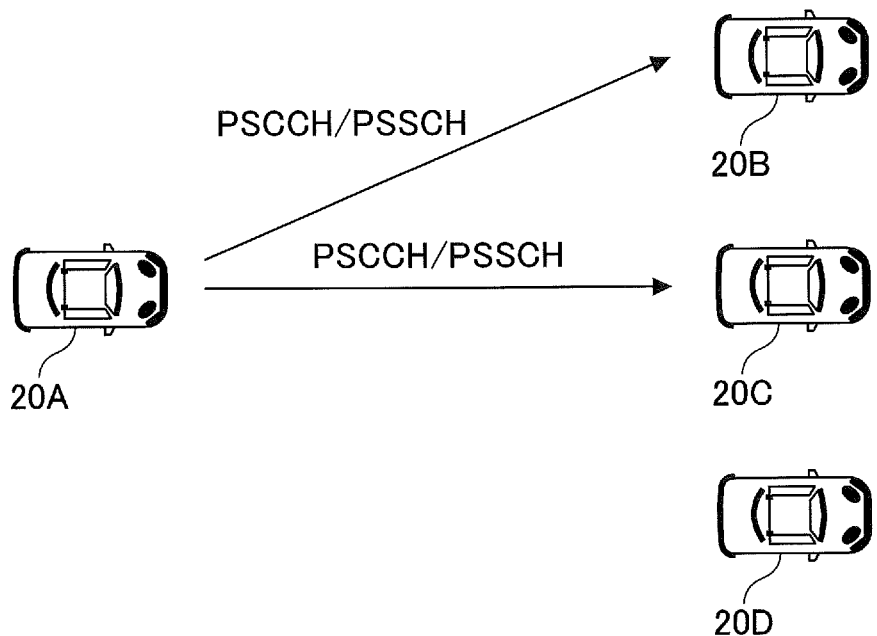
FIG. 7 is a drawing illustrating an example (1) of a communication type in V2X.

FIG. 7 is a drawing illustrating an example (1) of a communication type in V2X. The sidelink communication type illustrated in FIG. 7 is unicast. The terminal 20A transmits PSCCH and PSSCH to terminals 20. In the example illustrated in FIG. 7, the terminal 20A performs unicast to the terminal 20B and also performs unicast to a terminal 20C.

Figure 8:
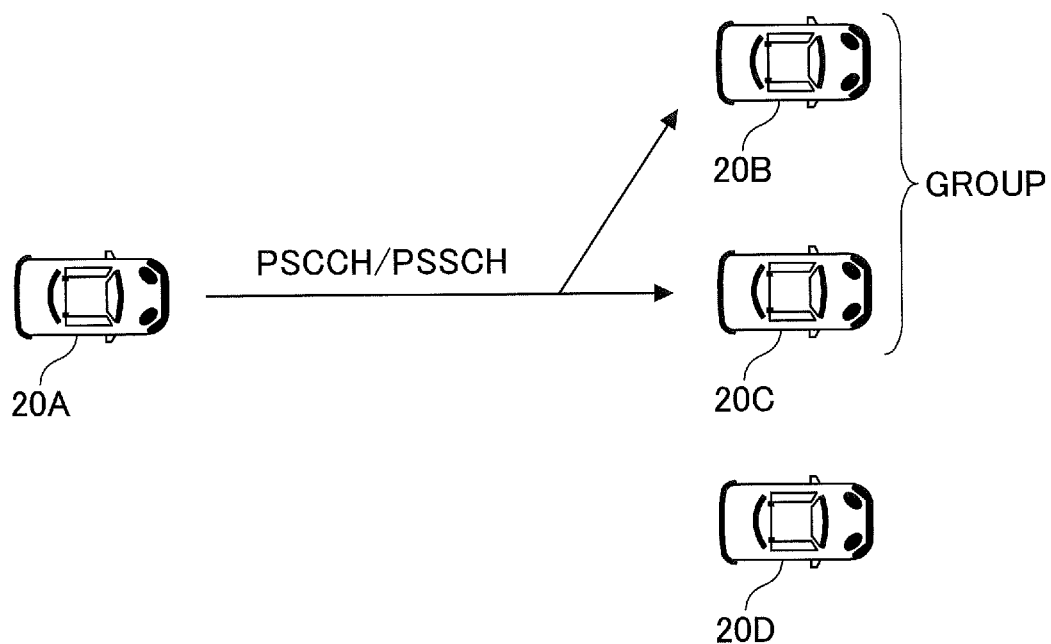
FIG. 8 is a drawing illustrating an example (2) of a communication type in V2X.

FIG. 8 is a drawing illustrating an example (2) of a communication type in V2X. The sidelink communication type illustrated in FIG. 8 is groupcast. The terminal 20A transmits PSCCH and PSSCH to a group to which one or more terminals 20 belong. In the example illustrated in FIG. 8, the group includes the terminal 20B and the terminal 20C, and the terminal 20A performs groupcast to the group.

Figure 9:
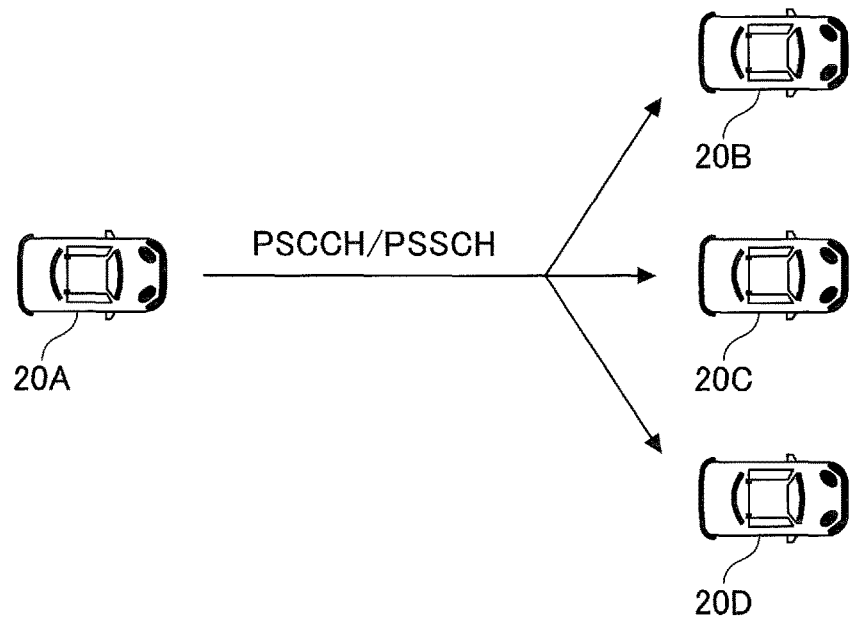
FIG. 9 is a drawing illustrating an example (3) of a communication type in V2X.

FIG. 9 is a drawing illustrating an example (3) of a communication type in V2X. The sidelink communication type illustrated in FIG. 9 is broadcast. The terminal 20A transmits PSCCH and PSSCH to one or more terminals 20. In the example illustrated in FIG. 9, the terminal 20A performs broadcast to the terminal 20B, the terminal 20C, and a terminal 20D. The terminal 20A illustrated in FIGS. 7 to 9 may be referred to as a header UE.

In NR-V2X, it is expected that sidelink unicast and sidelink groupcast support HARQ (hybrid automatic repeat request). Also, in NR-V2X, SFCI (sidelink feedback control information) including a HARQ response is defined. Further, it is being considered to transmit SFCI via PSFCH (Physical Sidelink Feedback Channel).

In an example described below, it is assumed that PSFCH is used to transmit HARQ-ACK in sidelink. However, PSCCH may be used to transmit HARQ-ACK in sidelink, PSSCH may be used to transmit HARQ-ACK in sidelink, or any other channel may be used to transmit HARQ-ACK in sidelink.

In the descriptions below, for convenience, various types of information reported by the terminal 20 in HARQ are referred to as HARQ-ACK. HARQ-ACK may be referred to as HARQ-ACK information. More specifically, a codebook used for HARQ-ACK information reported from the terminal 20 to, for example, the base station 10 is referred to as an HARQ-ACK codebook. The HARQ-ACK codebook defines bit strings of HARQ-ACK information. In addition to ACK, NACK is also transmitted via "HARQ-ACK".

Figure 10:
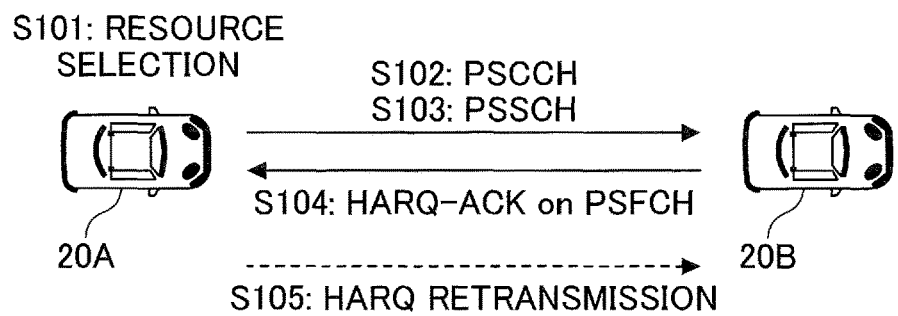
FIG. 10 is a sequence chart illustrating an example (1) of an operation in V2X.

FIG. 10 is a sequence chart illustrating an example (1) of an operation in V2X. As illustrated in FIG. 10, a radio communication system according to an embodiment of the present invention may include a terminal 20A and a terminal 20B. Although there may be a large number of user devices, FIG. 10 illustrates the terminal 20A and the terminal 20B as examples.

Hereafter, when it is not necessary to distinguish between the terminals 20A and 20B, they are simply referred to as "terminals 20" or "user devices". FIG. 10 illustrates an example where both of the terminal 20A and the terminal 20B are inside of the cell coverage. However, operations described in the embodiment of the present invention may also be applied to a case where the terminal 20B is outside of the cell coverage.

As described above, in the present embodiment, the terminal 20 may be, for example, a device installed in a vehicle such as an automobile, and includes a cellular communication function as a UE in LTE or NR and a sidelink function. The terminal 20 may be a general mobile terminal (e.g., a smartphone). The terminal 20 may also be an RSU. The RSU may be a UE-type RSU including a function of a UE or a gNB-type RSU including a function of a base station.

The terminal 20 is not necessarily a device in one housing. For example, the terminal 20 may include various sensors that are disposed in various positions in a vehicle.

The process performed by the terminal 20 to transmit data in sidelink is similar to the UL transmission process in LTE or NR. For example, the terminal 20 scrambles and modulates a codeword of transmission data to generate complex-valued symbols, maps the complex-valued symbols (transmission signal) to one or two layers, and precodes the complex-valued symbols. Then, the terminal 20 maps the precoded complex-valued symbols to resource elements to generate a transmission signal (example: complex-valued time-domain SC-FDMA signal), and transmits the transmission signal from each antenna port.

The base station 10 includes a cellular communication function as a base station in LTE or NR, and functions (e.g., resource pool configuration and resource allocation) for enabling communications of the terminal 20 of the present embodiment. The base station 10 may also be an RSU (gNB-type RSU).

In the radio communication system of the embodiment of the present invention, the signal waveform used by the terminal 20 for SL or UL may be OFDMA, SC-FDMA, or any other signal waveform.

At step S101, the terminal 20A autonomously selects resources to be used for PSCCH and PSSCH from a resource selection window having a predetermined period. The resource selection window may be set by the base station 10 for the terminal 20.

At step S102 and step S103, the terminal 20A transmits sidelink control information (SCI) via PSCCH and/or PSSCH and transmits SL data via PSSCH by using the resources autonomously selected at step S101. For example, the terminal 20A may transmit PSCCH using a time resource that is the same as at least a part of the time resource for PSSCH and using a frequency resource that is adjacent to the frequency resource for PSSCH.

The terminal 20B receives the SCI (PSCCH and/or PSSCH) and the SL data (PSSCH) transmitted from the terminal 20A. The received SCI may include information on resources for PSFCH used by the terminal 20B to transmit HARQ-ACK for the reception of the data. The terminal 20A may include the information on the autonomously selected resources in SCI for transmission.

At step S104, the terminal 20B transmits HARQ-ACK for the received data to the terminal 20A by using the resources for PSFCH determined based on the received SCI.

At step S105, the terminal 20A retransmits PSCCH and PSSCH to the terminal 20B if the HARQ-ACK received at step S104 indicates a request for retransmission, i.e., NACK (negative acknowledgment). The terminal 20A may retransmit PSCCH and PSSCH using autonomously selected resources.

When HARQ control is not performed, step S104 and step S105 may be omitted.

Figure 11:
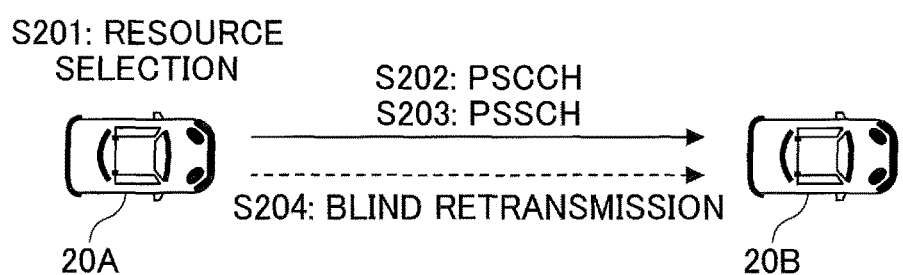
FIG. 11 is a sequence chart illustrating an example (2) of an operation in V2X.

FIG. 11 is a sequence chart illustrating an example (2) of an operation in V2X. Blind retransmission without using HARQ control may be performed to improve the success rate or the reach of transmission.

At step S201, the terminal 20A autonomously selects resources to be used for PSCCH and PSSCH from a resource selection window having a predetermined period.

The resource selection window may be set by the base station 10 for the terminal 20.

At step S202 and step S203, the terminal 20A transmits SCI via PSCCH and/or PSSCH and transmits SL data via PSSCH by using the resources autonomously selected at step S201. For example, the terminal 20A may transmit PSCCH using a time resource that is the same as at least a part of the time resource for PSSCH and using a frequency resource that is adjacent to the frequency resource for PSSCH.

At step S204, the terminal 20A retransmits SCI via PSCCH and/or PSSCH and retransmits SL data via PSSCH to the terminal 20B by using the resources autonomously selected at step S201. The retransmission at step S204 may be performed multiple times.

When blind blind retransmission is not performed, step S204 may be omitted.

Figure 12:
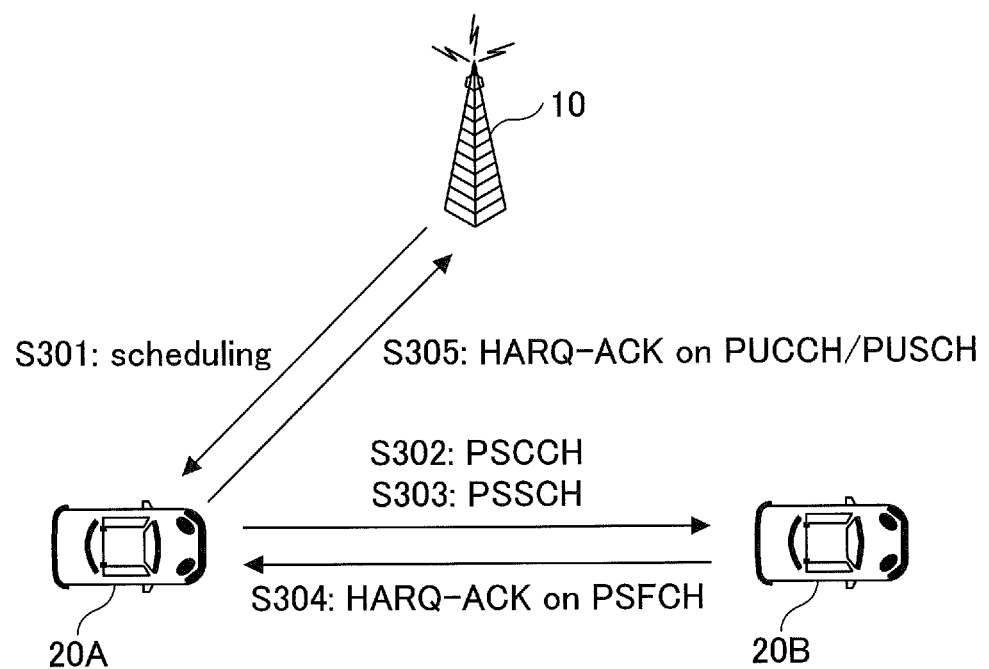
FIG. 12 is a sequence chart illustrating an example (3) of an operation in V2X.

FIG. 12 is a sequence chart illustrating an example (3) of an operation in V2X. The base station 10 may perform sidelink scheduling. That is, the base station 10 may determine sidelink resources to be used by the terminal 20 and transmit information indicating the resources to the terminal 20. Also, when HARQ control is performed, the base station 10 may transmit information indicating resources for PSFCH to the terminal 20.

At step S301, the base station 10 performs SL scheduling by sending downlink control information (DCI) via PDCCH to the terminal 20A. Hereafter, for convenience, DCI for SL scheduling is referred to as SL scheduling DCI.

Also, at step S301, it is assumed that the base station 10 also transmits DCI for DL scheduling (which may be referred to as DL allocation) to the terminal 20A via PDCCH. Hereafter, for convenience, DCI for DL scheduling is referred to as DL scheduling DCI. Upon receiving the DL scheduling DCI, the terminal 20A receives DL data via PDSCH using resources specified by the DL scheduling DCI.

At step S302 and step S303, the terminal 20A transmits sidelink control information (SCI) via PSCCH and/or PSSCH and transmits SL data via PSSCH using the resources specified by the SL scheduling DCI. The SL scheduling DCI may be configured to specify only resources for PSSCH. In this case, for example, the terminal 20A 20A may transmit PSCCH using a time resource that is the same as at least a part of the time resource for PSSCH and using a frequency resource that is adjacent to the frequency resource for PSSCH.

The terminal 20B receives the SCI (PSCCH and/or PSSCH) and the SL data (PSSCH) transmitted from the terminal 20A. The SCI received via PSCCH and/or PSSCH includes information on resources for PSFCH used by the terminal 20B to transmit HARQ-ACK for the reception of the data.

The information on the resources is included in the DL scheduling DCI or the SL scheduling DCI transmitted from the base station 10 at step S301. The terminal 20A obtains the information on the resources from the DL scheduling DCI or the SL scheduling DCI and includes the information on the resources in SCI. Alternatively, the DCI transmitted from the base station 10 may not include the information on the resources, and the terminal 20A may autonomously include the information on the resources in the SCI and transmit the SCI.

At step S304, the terminal 20B transmits HARQ-ACK for the received data to the terminal 20A using the resources for PSFCH determined based on the received SCI.

At step S305, the terminal 20A transmits HARQ-ACK at a timing (for example, timing for each slot) specified by the DL scheduling DCI (or SL scheduling DCI) using resources for PUCCH (physical uplink control channel) specified by the DL scheduling DCI (or SL scheduling DCI), and the base station 10 receives the HARQ-ACK. The HARQ-ACK codebook may include the HARQ-ACK received from the terminal 20B or an HARQ-ACK generated based on PSFCH not received, and HARQ-ACK for DL data. However, when there is no assignment for DL data, HARQ-ACK for DL data is not included. In NR Rel.16, the HARQ-ACK codebook does not include HARQ-ACK for DL data.

When HARQ control is not performed, step S304 and step S305 may be omitted.

Figure 13:
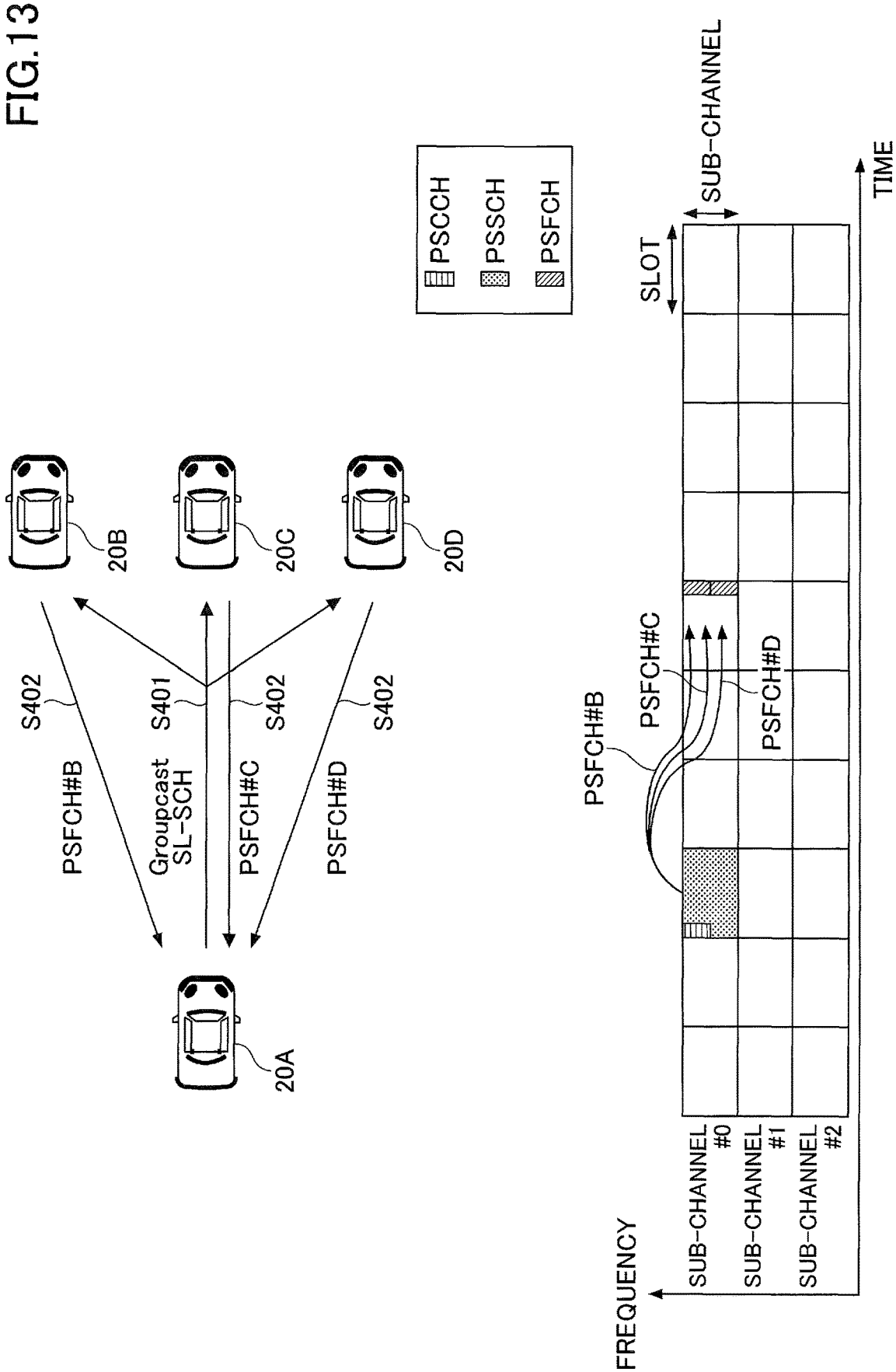
FIG. 13 is a sequence chart illustrating an example (4) of an operation in V2X.

FIG. 13 is a sequence chart illustrating an example (4) of an operation in V2X. As described above, NR sidelink supports transmitting an HARQ response via PSFCH. For PSFCH, for example, a format similar to the PUCCH (Physical Uplink Control Channel) format 0 may be used. That is, PSFCH may have a sequence-based format where the size of a physical resource block (PRB) is 1, and ACK and NACK are identified based on a difference between sequences. The PSFCH format is not limited to this example. Resources for PSFCH may be mapped to a symbol at the end of a slot or to multiple symbols at the end of a slot. Also, a period N is set or predetermined for the PSFCH resources. The period N may be set or predetermined for each slot.

In FIG. 13, the vertical axis corresponds to the frequency domain and the horizontal axis corresponds to the time domain. The PSCCH may be mapped to one symbol at the beginning of a slot, to multiple symbols from the beginning, or to multiple symbols starting from a symbol other than the symbol at the beginning. PSFCH may be mapped to one symbol at the end of a slot or to multiple symbols at the end of a slot. In the example illustrated in FIG. 13, three subchannels are set in the resource pool, and two PSFCHs are mapped to the third slot after the slot to which PSSCH is mapped. Arrows from PSSCH to PSFCH indicate examples of PSFCHs associated with PSSCH.

When the HARQ response in the NR-V2X groupcast is option 2 for transmitting ACK or NACK, it is necessary to determine resources used to transmit and receive PSFCH. As illustrated in FIG. 13, at step S401, the terminal 20A, which is the transmitting-end terminal 20, performs groupcast via SL-SCH to the terminal 20B, the terminal 20C, and terminal 20D that are the receiving-end terminals 20. In the following step S402, the terminal 20B uses PSFCH #B, the terminal 20C uses PSFCH #C, and the terminal 20D uses PSFCH #D to transmit HARQ responses to the terminal 20A. Here, when the number of available PSFCH resources is less than the number of the receiving-end terminals 20 belonging to the group as in the example of FIG. 13, it is necessary to determine how to assign the PSFCH resources. The transmitting-end terminal 20 may know the number of the receiving-end terminals 20 in the groupcast.

Here, in a future release (e.g., NR release 17), sidelink enhancement is being discussed. For example, enhancement of power reduction is being discussed based on random resource selection and partial sensing in LTE Release 14. Also, for example, as enhanced URLLC (enhanced Ultra-Reliable and Low Latency Communications), enhancement is being discussed based on inter-UE coordination in the study phase of NR sidelink. As an example of inter-terminal coordination, the terminal 20A may share a resource set with the terminal 20B, and the terminal 20B may consider the resource set in resource selection.

The communication quality may be improved by transmitting various types of information from the terminal 20A to the terminal 20B and enabling the terminal 20B to operate based on the information. That is, it is considered to be effective to share not only the resource set but also other types of information between the terminals 20. However, it has been unknown what types of information need to be shared between the terminals 20. Also, it has been unknown how to use the information shared between the terminals 20.

Therefore, the terminal 20A may transmit at least one of information items A)-D) below to the terminal 20B.

A) Information related to a synchronization source
B) Information related to PSFCH occasions to be transmitted and received
C) Information related to transmission power reduction resulting from in-device coexistence
D) Information related to resources that are reserved but are not going to be used Here, the terminal 20B may be a single terminal 20 or multiple terminals 20. That is, the terminal 20A may groupcast the above information, and the terminal 20A may broadcast the above information. The "in-device coexistence" in C) may correspond to a case where multiple channels overlap each other in at least the time domain in the terminal 20A.

Further, the terminal 20A may perform resource selection for the terminal 20B based on at least one of A)-D).

Higher reliability or higher communication quality can be achieved by performing resource selection using additional information of A)-D).

Figure 14:
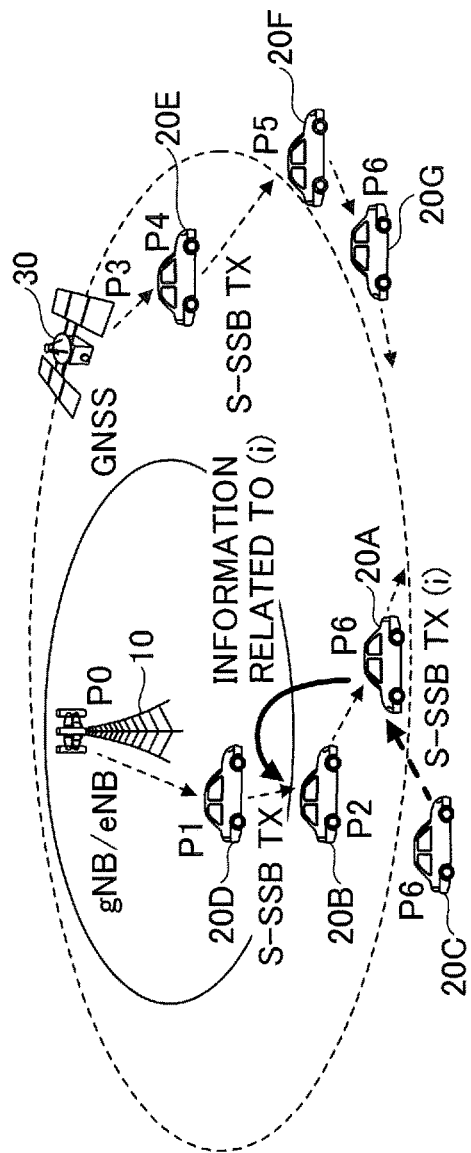
FIG. 14 is a drawing illustrating an example (1) of information related to synchronization sources according to an embodiment of the present invention.

FIG. 14 is a drawing illustrating an example (1) of information on synchronization sources according to an embodiment of the present invention. "A) Information related to a synchronization source" may be information based on S-SSB (Sidelink-SS/PBCH block) received by the terminal 20. S-SSB is a signal including a synchronization signal and broadcast information in sidelink transmitted by the terminal 20. S-SSB_TX indicates a signal of transmitted S-SSB.

As illustrated in FIG. 14, the terminal 20A receives S-SSB_TX (i) from the terminal 20C. Subsequently, the terminal 20A uses S-SSB TX received from the terminal 20B as a synchronization source. Here, the terminal 20A may transmit, to the terminal 20B, information related to S-SSB_TX (i) that is received from the terminal 20C and is a synchronization source other than the synchronization source being used. For example, the information related to S-SSB_TX (i) may be an RSRP (Reference Signal Received Power) value. Also, for example, the information related to S-SSB_TX (i) may be a time difference (for example, X ms) between S-SSB_TX, which is received from the terminal 20B and is the synchronization source being used, and S-SSB_TX (i), which is received from the terminal 20C and is the synchronization source not being used.

Further, the terminal 20A may transmit, to the terminal 20B, the RSRP value of S-SSB_TX that is received from the terminal 20B and is being used as a synchronization source.

FIG. 14 illustrates an example of priority levels of synchronization sources. The base station 10, which is gNB/eNB with the highest priority level, corresponds to a priority level P0. The terminal 20D, which is a UE that is directly synchronized with gNB/eNB and has the next highest priority level, corresponds to a priority level P1. The terminal 20B, which is indirectly synchronized with gNB/eNB and has the next priority level, corresponds to a priority level P2. A GNSS 30, which has the next priority level, corresponds to a priority level P3. A terminal 20E, which is a UE that is directly synchronized with GNSS and has the next priority level, corresponds to a priority level P4. A terminal 20F, which is a UE that is indirectly synchronized with GNSS and has the next priority level, corresponds to a priority level P5. The terminal 20A, the terminal 20C, and a terminal 20G, which are other UEs having the lowest priority level, correspond to a priority level P6.

Figure 15:
FIG. 15 is a drawing illustrating an example (2) of information related to synchronization sources according to an embodiment of the present invention.
Figure 15:
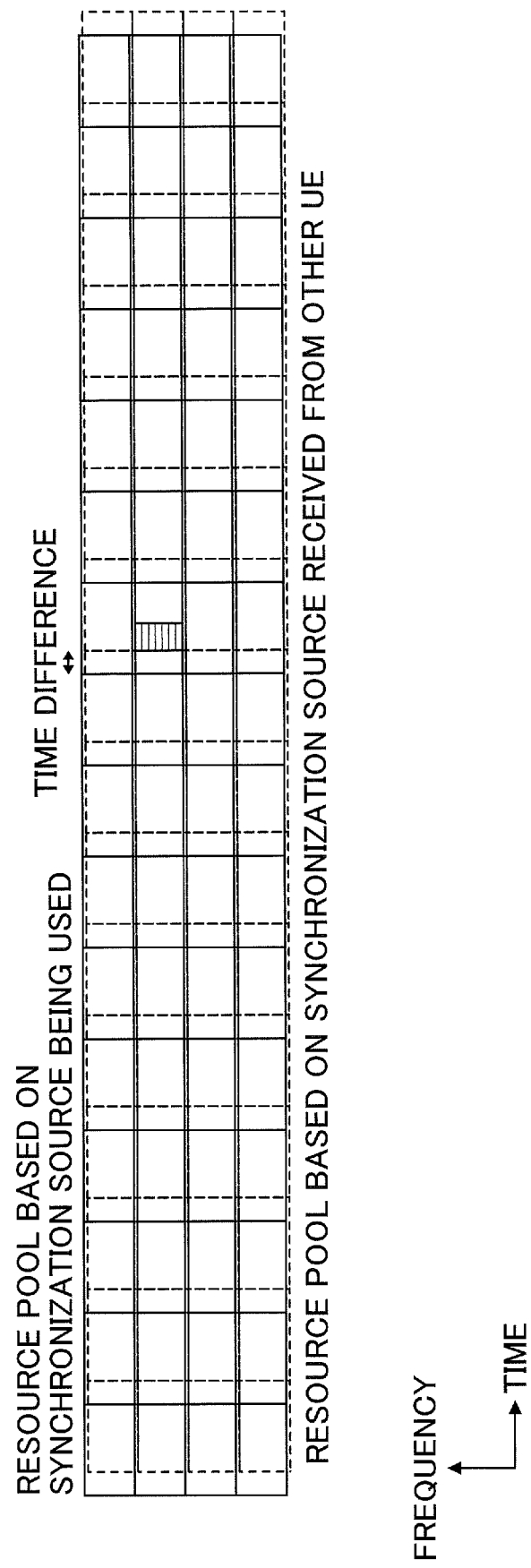

FIG. 15 is a drawing illustrating an example (2) of information related to synchronization sources according to an embodiment of the present invention. The terminal 20B illustrated in FIG. 14 may perform a resource allocation operation based on the information related to S-SSB that is transmitted from the terminal 20C and received from the terminal 20A.

For example, the terminal 20B may decode SCI in PSCCH/PSSCH and perform sensing based on the information related to S-SSB transmitted from the terminal 20C and received from the terminal 20A.

Also, for example, as illustrated in FIG. 15, the terminal 20B may obtain the time difference between synchronization sources based on the information related to S-SSB transmitted from the terminal 20C and received from the terminal 20A. The time difference may correspond to the time difference between a resource pool based on information related to a synchronization source received from another UE and a resource pool based on the synchronization source being used. The terminal 20B may detect power based on the time difference between the synchronization sources described above. For example, if it is detected that the change in power has become greater than or equal to a predetermined value by the sensing based on the time difference between the synchronization sources, the terminal 20B may determine that there has been certain transmission regardless of success or failure of the decoding of SCI.

Based on the time difference between the synchronization sources, the terminal 20B may identify resources, determine unavailable resources, and exclude the unavailable resources from candidate resources that are supposed to be available. For example, the terminal 20B may exclude resources determined based on a time resource assignment field and/or a resource reservation period field in the decoded SCI from the candidate resources that supposed to be available. Also, for example, when the existence of transmission is detected by sensing based on the time difference between the synchronization sources, the terminal 20B may exclude resources determined based the time resource allocation field and/or the resource reservation period field that can be specified by the transmission from the candidate resources that are supposed to be available.

Further, for example, the terminal 20B may determine whether to stop transmission, based on the time difference between the synchronization sources and/or the power detection. For example, when detecting transmission based on different synchronization sources, the terminal 20B may stop sidelink transmission using related resources.

As described above, performing resource selection or resource allocation based on information related to synchronization sources obtained from another terminal 20 makes it possible to select resources so as not to collide with transmission performed by a terminal 20 operating based on a different synchronization source.

Figure 16:
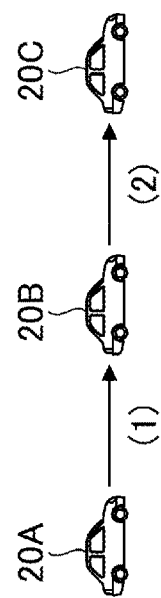
FIG. 16 is a drawing illustrating an example (1) of information related to an HARQ response according to an embodiment of the present invention.
Figure 16:
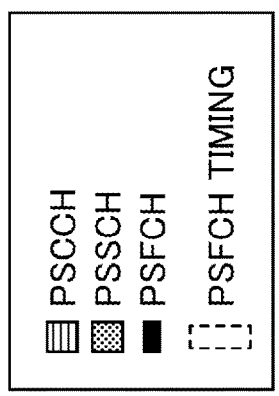
Figure 16:
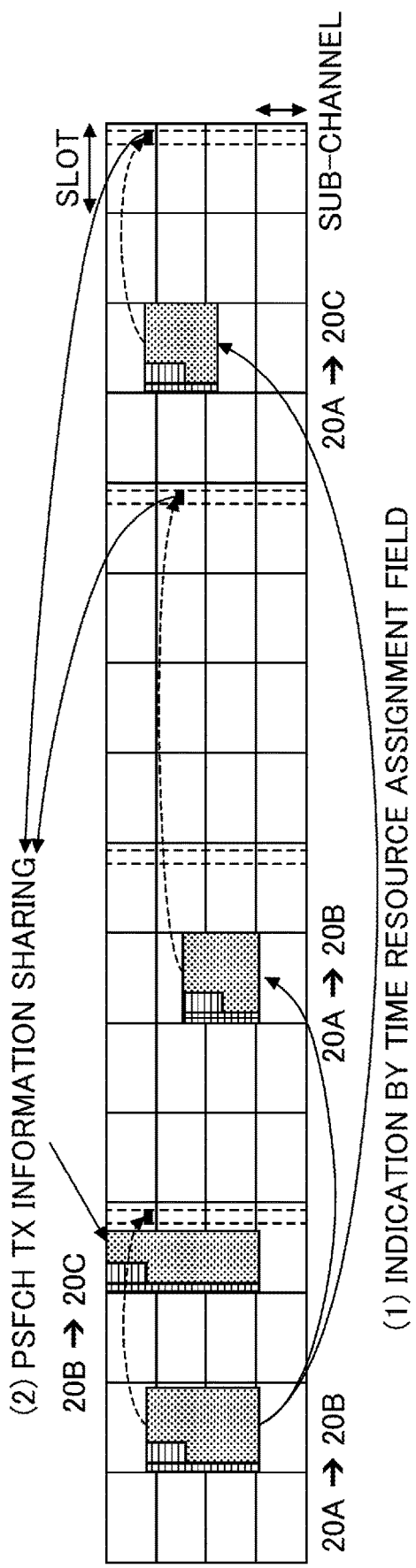

FIG. 16 is a drawing illustrating an example (1) of information related to an HARQ response according to an embodiment of the present invention. "B) Information related to PSFCH occasions to be transmitted and received" described above may be information related to transmission and reception of PSFCH related to communications with any terminal. The information related to PSFCH occasions may indicate, for example, a time domain, a frequency domain, and/or a code domain in which PSFCH occasions are configured. For example, the information related to PSFCH occasions may be any one of 1)-4) below.

1) PSFCH occasion corresponding to PSCCH/PSSCH received by the terminal 20
2) PSFCH occasion corresponding to a resource indicated by a time resource allocation field included in SCI in PSCCH/PSSCH received by the terminal 20
3) PSFCH occasion corresponding to a resource indicated by a resource reservation period field included in SCI in PSCCH/PSSCH received by the terminal 20
4) PSFCH occasion corresponding to a resource (an unreserved resource) selected to perform transmission at the terminal 20

FIG. 16 illustrates an example corresponding to the case 2) where the terminal 20B indicates, to the terminal 20C, information related to PSFCH occasions corresponding to PSCCH/PSSCH received from the terminal 20A. In the example of FIG. 16, the period of several symbols at the beginning of PSCCH/PSSCH corresponds to a time period required for switching between sidelink transmission and reception. As illustrated in FIG. 16, the terminal 20A transmits PSCCH/PSSCH to the terminal 20B. Here, information related to PSFCH occasions corresponding to two resources indicated by the time resource allocation field indicated by PSCCH/PSSCH to the terminal 20B may be indicated from the terminal 20B to the terminal 20C.

Note that a priority level may be indicated together with, or independently from, the information related to the PSFCH occasions. The priority level may be a priority level in SCI or a priority level in the upper layer (e.g., a priority level of a logical channel related to the corresponding PSCCH/PSSCH). In the PSFCH occasions 1)-4), "received" may be replaced with "transmitted". For example, the information related to PSFCH occasions corresponding to PSCCH/PSSCH transmitted by a terminal 20 may be indicated to another terminal 20. The terminal 20 in 1)-4) above may be replaced with any terminal 20. For example, the terminal 20A illustrated in FIG. 16 may transmit information related to a PSFCH occasion to be transmitted to the terminal 20C.

As described above, indicating information related to PSFCH to be received or transmitted by a terminal 20 to another terminal 20 makes it possible to predict a collision between transmission/reception of PSFCH and PSFCH transmitted/received by the terminal and thereby makes it possible to avoid the collision as necessary.

Figure 17:
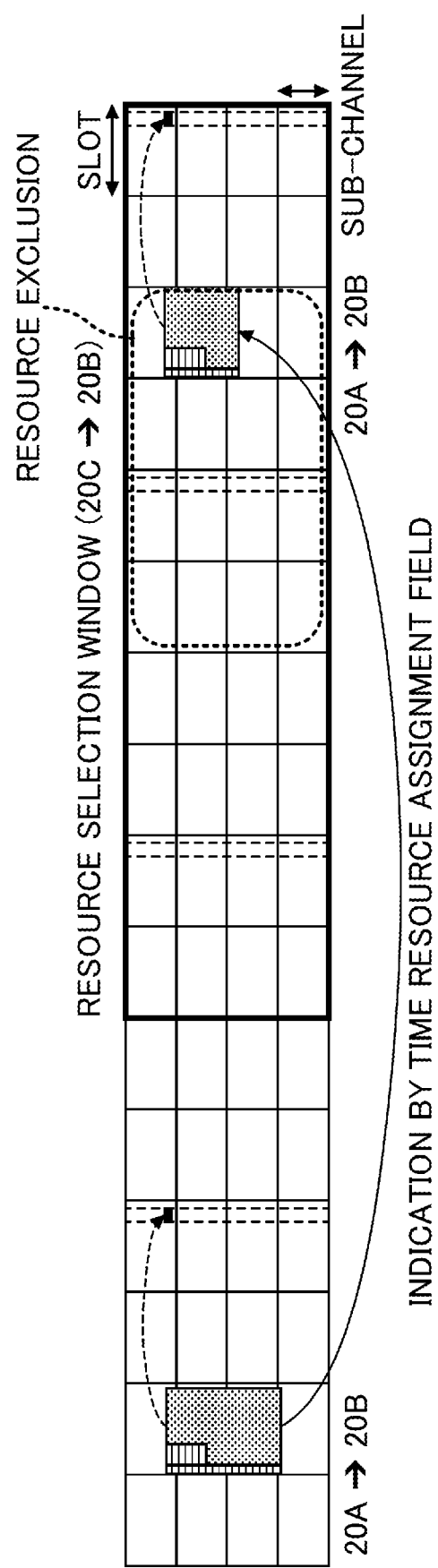
FIG. 17 is a drawing illustrating an example (2) of information related to an HARQ response according to an embodiment of the present invention.

FIG. 17 is a drawing illustrating an example (2) of information related to an HARQ response according to an embodiment of the present invention. The terminal 20 may perform a resource allocation operation based on information related to PSFCH occasions received from another terminal. In FIG. 17, it is assumed that the terminal 20C receives, from the terminal 20B, information related to PSFCH occasions corresponding to PSCCH/PSSCH transmitted from the terminal 20A to the terminal 20B as illustrated in FIG. 16.

As illustrated in FIG. 17, the terminal 20C may perform at least one of operations 1)-3) below, based on the information related to PSFCH occasions received from the terminal 20B.

1) The terminal 20C may determine PSCCH/PSSCH resources corresponding to a PSFCH occasion used by the terminal 20B and exclude the determined resources from available candidate resources (i.e., a resource selection window). The exclusion may be applied only when the terminal 20C intends to perform retransmission based on a HARQ response. Also, the exclusion may be applied only when the priority level of PSFCH transmitted or received by the terminal 20B at the PSFCH occasion used by the terminal 20B is higher than a specific value. The specific value may be, for example, a priority level corresponding to PSCCH/PSSCH to be transmitted by the terminal 20C to the terminal 20B. Note that the exclusion may be applied only when the terminal 20C performs transmission to one or more terminals 20 including the terminal 20B. The PSFCH occasion used by the terminal 20B may be a PSFCH occasion at which the terminal 20B can perform PSFCH transmission or a PSFCH occasion at which the terminal 20B can perform PSFCH reception.

2) When the PSFCH occasion is the occasion at which the terminal 20B can perform PSFCH transmission, the terminal 20C may determine PSCCH/PSSCH resources corresponding to the PSFCH occasion used by the terminal 20B and exclude the determined resources from the available candidate resources (i.e., a resource selection window) only when the number of PSFCH transmissions at the PSFCH occasion is greater than a predetermined value or greater than or equal to the predetermined value.

3) When the PSFCH occasion is the occasion at which the terminal 20B can perform PSFCH reception, the terminal 20C may determine PSCCH/PSSCH resources corresponding to the PSFCH occasion used by the terminal 20B and exclude the determined resources from the available candidate resources (i.e., a resource selection window) only when the number of PSFCH receptions at the PSFCH occasion is greater than a predetermined value or greater than or equal to the predetermined value.

As described above, indicating information related to PSFCH received or transmitted by a terminal 20 to another terminal 20 makes it possible to select resources other than resources for which PSFCH transmission from a receiving terminal cannot be expected and thereby makes it possible to guarantee the HARQ feedback.

Figure 18:
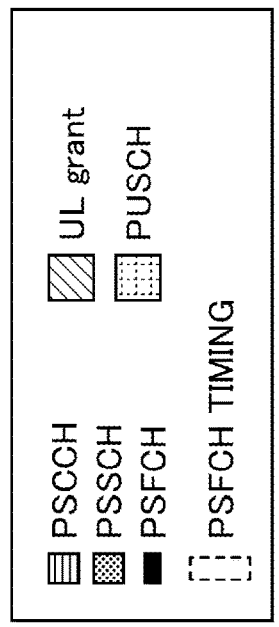
FIG. 18 is a drawing illustrating an example (1) of information related to transmission power reduction according to an embodiment of the present invention.
Figure 18:
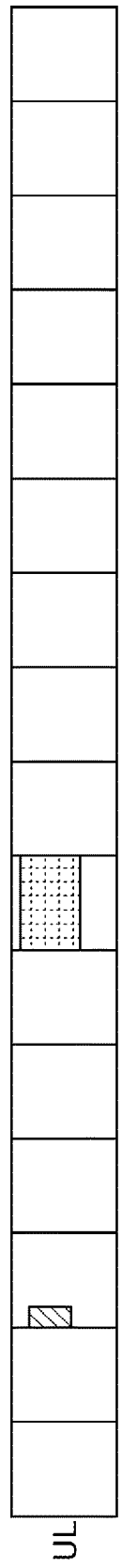
Figure 18:
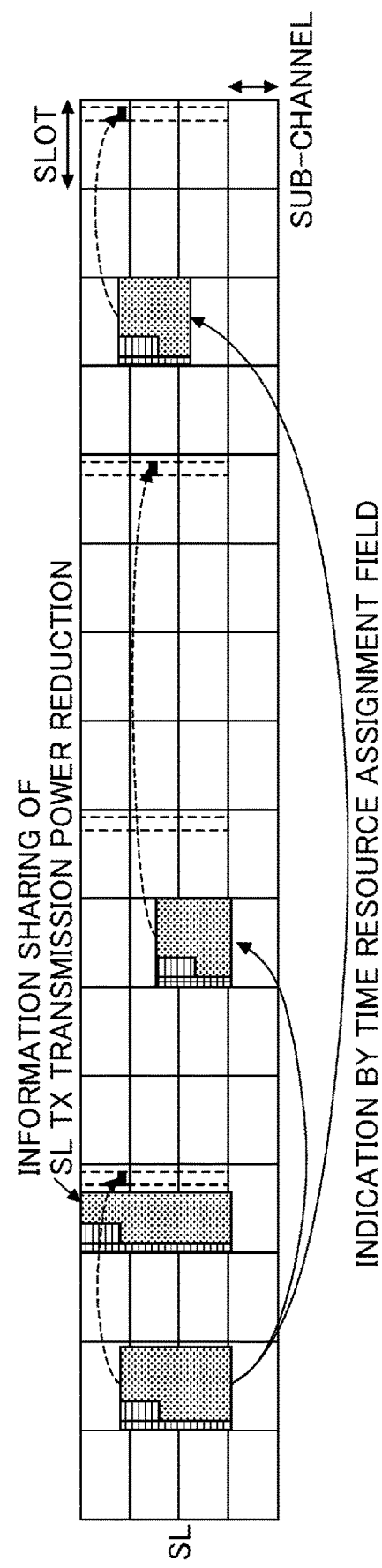

FIG. 18 is a drawing illustrating an example (1) of information related to transmission power reduction according to an embodiment of the present invention. "C) Information related to transmission power reduction" may be information related to transmission power reduction resulting from in-device coexistence" may be information related to transmission power reduction resulting from an overlap between SL transmission and UL transmission in at least the time domain in a terminal 20. SL transmission and UL transmission may be replaced with first SL transmission and second SL transmission. The first SL transmission may be SL transmission in NR, and the second SL transmission may be SL transmission in LTE. In the descriptions below, SL transmission and UL transmission are used as examples. For example, information related to transmission power reduction may be a fact that UL transmission is prioritized over SL transmission and transmission power for SL transmission is reduced. Also, for example, the information related to transmission power reduction may be the amount of reduced transmission power when UL transmission is prioritized over SL transmission and the transmission power for SL transmission is reduced. A specific granularity may be applied to the amount of reduced transmission power.

As illustrated in FIG. 18, when the transmission power for SL transmission reserved by the time resource allocation field is to be reduced due to UL transmission, i.e., PUSCH, that overlaps the SL transmission in the time domain, the transmitting-end terminal 20 performing the SL transmission may indicate information related to the transmission power reduction to a destination terminal 20 or another terminal 20 to which the SL transmission is directed.

Figure 19:
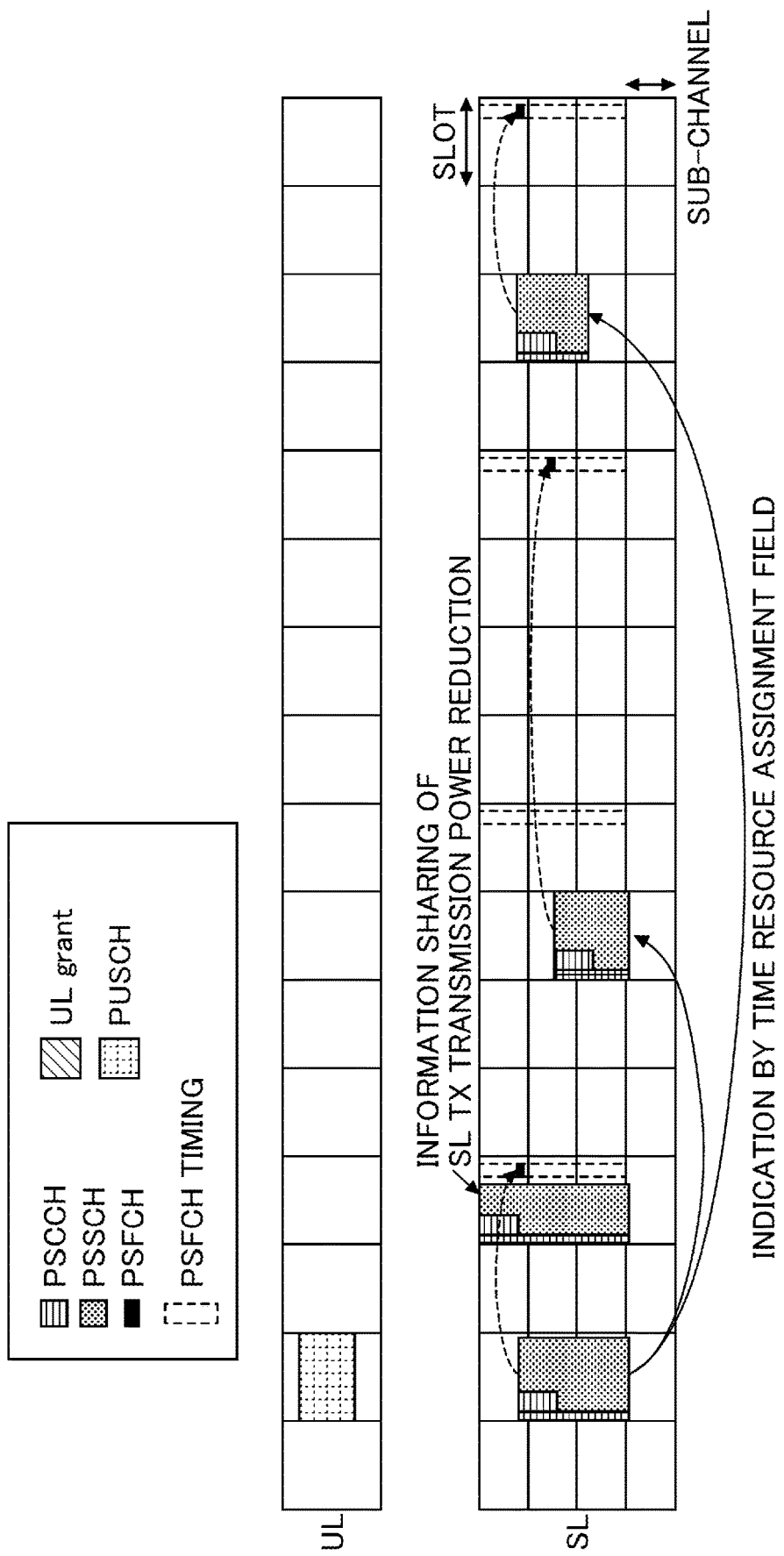
FIG. 19 is a drawing illustrating an example (1) of information related to transmission power reduction according to an embodiment of the present invention.

FIG. 19 is a drawing illustrating an example (1) of information related to transmission power reduction according to an embodiment of the present invention. As illustrated in FIG. 19, when the transmission power for the SL transmission is reduced due to UL transmission or PUSCH that overlaps the transmitted SL transmission resource in the time domain, the transmitting-end terminal 20 performing the SL transmission may indicate the information related to the transmission power reduction to the destination terminal 20 or another terminal 20 to which the SL transmission is directed.

At least one of UL transmission and SL transmission may be scheduled by a dynamic grant. Also, at least one of UL transmission and SL transmission may be configured or indicated as a semi-persistent transmission. That is, at least one of UL transmission and SL transmission may be scheduled by a configured grant type 1 and a configured grant type 2.

As described above, indicating information related to transmission power reduction from a terminal 20 to another terminal 20 enables the other terminal 20 to more accurately determine the availability status of resources.

The terminal 20 may perform a resource allocation operation based on the information related to transmission power reduction resulting from the in-device coexistence received from another terminal 20.

As operations based on the information related to transmission power reduction in resources reserved by another terminal 20, the terminal 20 may perform operations 1)-3) below.

1) In a resource identification operation, with respect to the resources indicated by SCI received from another terminal 20, when a fact of transmission power reduction resulting from the in-device coexistence is received from the other terminal 20, the terminal 20 may determine a resource whose transmission power is reduced as an available resource. When the fact of transmission power reduction resulting from the in-device coexistence is not received from the other terminal 20, the terminal 20 may determine that the corresponding resource cannot be used and may exclude the resource from the available candidate resources. That is, the terminal 20 may determine whether a resource is available based on the information related to transmission power reduction received from the other terminal 20.

2) The terminal 20 may determine that a resource whose transmission power is reduced is available only when the power value (e.g., RSRP) of PSCCH/PSSCH received from the other terminal 20 is less than a predetermined value or less than or equal to the predetermined value. When the power value (e.g., RSRP) of PSCCH/PSSCH received from the other terminal 20 is greater than the predetermined value or greater than or equal to the predetermined value, the terminal 20 may exclude the corresponding resource from the available candidate resources. That is, the terminal 20 may determine whether a resource is available based on the power value received from the other terminal 20.

3) In a resource identification operation, with respect to the resources specified by SCI received from another terminal 20, the terminal 20 may subtract the amount of transmission power reduction resulting from the in-device coexistence from the power value (e.g., RSRP) of PSCCH/PSSCH received from the other terminal 20 (for example, when a reduction of 3 dB is indicated, 3 dB is subtracted from the power value), and may determine whether the resources are available based on the transmission power value after the subtraction.

The terminal 20 may perform operations 1)-3) below as operations based on the information, sent from another terminal 20, related to transmission power reduction of transmitted resources.

1) In a resource identification operation, with respect to the resources specified by SCI received from the other terminal 20, when a fact of transmission power reduction resulting from the in-device coexistence is received from the other terminal 20, the terminal 20 may determine resources whose transmission power has been reduced as available resources. When the fact of transmission power reduction resulting from the in-device coexistence is not received from the other terminal 20, the terminal 20 may determine that the corresponding resources are not available and may exclude the resources from the available candidate resources. That is, the terminal 20 may determine whether resources are available based on the information related to transmission power reduction received from the other terminal 20.

2) The terminal 20 may determine that resources corresponding to the resources whose transmission power has been reduced are available only when the power value (e.g., RSRP) of PSCCH/PSSCH received from another terminal 20 is less than a predetermined value or less than or equal to the predetermined value. When the power value (e.g., RSRP) of PSCCH/PSSCH received from the other terminal 20 is greater than the predetermined value or greater than or equal to the predetermined value, the terminal 20 may exclude the corresponding resources from the available candidate resources. That is, the terminal 20 may determine whether resources are available based on the power value received from the other terminal 20.

3) In a resource identification operation, with respect to the resources specified by SCI received from another terminal 20, the terminal 20 may add the amount of transmission power reduction resulting from the in-device coexistence to the power value (e.g., RSRP) of PSCCH/PSSCH received from the other terminal 20 (for example, when a reduction of 3 dB is indicated, 3 dB is added to the power value), and may determine whether the resources are available based on the transmission power value after the addition.

Here, resource identification may be an operation for determining unavailable resources and excluding the determined unavailable resources from available candidate resources. Also, the terminal 20 need not be limited to the destination of SL transmission from the other terminal 20, and may be a target of groupcast or broadcast by the other terminal 20.

As described above, the terminal 20 can perform resource selection based on an actual reception power prediction value after the transmission power reduction, and can more effectively avoid collision.

"D) Information related to resources that are reserved but are not to be used" may be information related to resources that are available but are not to be used, or information related to resources that have become unavailable. For example, this information may be applied to cases 1)-5) below.

1) A case where a resource has been reserved but retransmission has become unnecessary because the transmission of a transport block has been successful (i.e., ACK is received).
2) A case where a resource has been reserved but retransmission of a first transport block has been canceled or postponed because more important SL data has been generated.
3) A case where a resource has been reserved but the resource is stolen (pre-empted) by another terminal 20.
4) A case where a resource has been reserved but transmission is canceled or postponed because the resource has overlapped UL transmission at least in the time domain.
5) A case where a resource has been reserved but transmission is canceled or postponed according to a decision formula ($\Sigma_{i \geq k}$ CR(i)$\leq$CRLimit (k)) for congestion control.

Note that, CR (channel occupancy ratio) is an index related to a resource used by the device itself, and CBR (channel busy ratio) is an index related to a resource used by another device. CR(i) is a CR evaluation value in a slot n-N used for transmission of PSSCH whose priority level field in SCI is i. $CR_{Limit}$ (k) corresponds to an upper layer parameter sl-CR-Limit and is associated with priority k and a range of CBR including a CBR measured at the slot n-N. N indicates a process time for congestion control. Also, pre-emption may refer to a case where, with respect to a resource that is reserved by the terminal 20, the terminal 20 receives a signal indicating the same resource from another terminal 20.

The information related to resources that are reserved but are not to be used may be information indicating resources not to be used or information indicating reasons why the resources are not used. Also, resources may be reserved by an indication in the time resource allocation field in SCI, or may be reserved by an indication in the resource reservation period field.

As described above, the terminal 20 can more accurately determine the availability status of resources by receiving, from another terminal 20, information related to resources that have been reserved but are not to be used.

Figure 20:
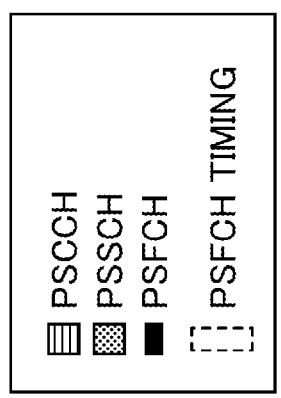
FIG. 20 is a drawing illustrating an example of information related to resources not to be used according to an embodiment of the present invention.
Figure 20:
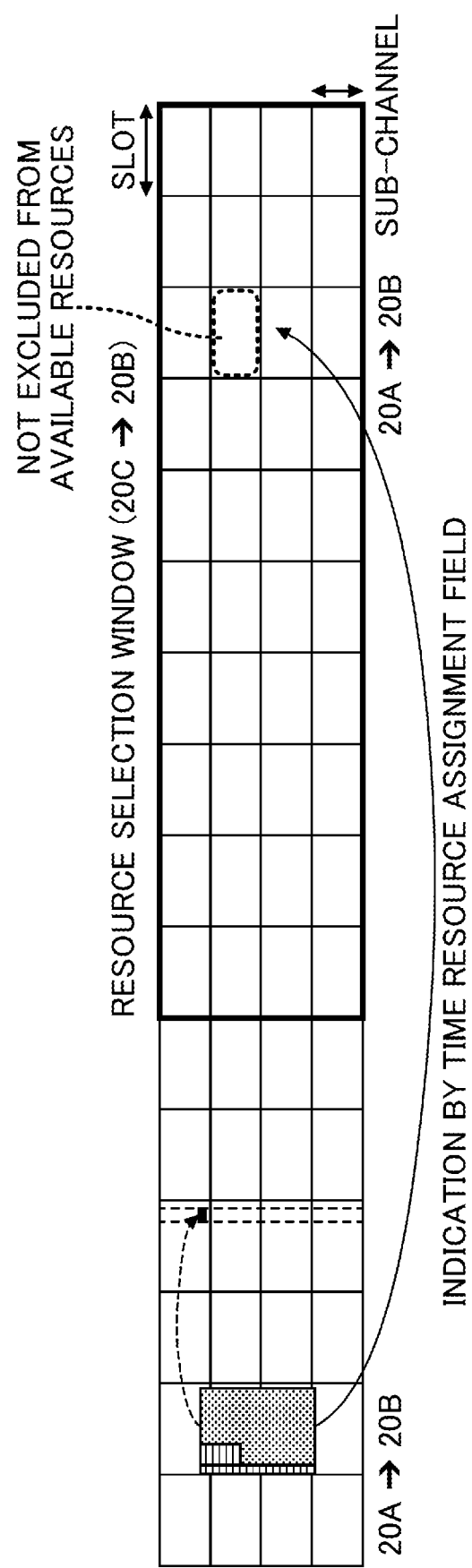

FIG. 20 is a drawing illustrating an example of information related to resources not to be used according to an embodiment of the present invention. The terminal 20 may perform a resource allocation operation based on information received from another terminal 20 and indicating resources that have been reserved but are not to be used.

For example, as illustrated in FIG. 20, with respect to resources indicated by SCI received by the terminal 20B from the terminal 20A, the resources are targeted by the terminal 20C, based on an indication from the terminal 20A or the terminal 20B. In a case where it is further indicated by the terminal 20A or the terminal 20B that the resources are not to be used, the terminal 20C may determine that the resources are available without excluding the resources from available candidate resources. In a case where the terminal 20A or the terminal 20B does not indicate that the resources are not to be used, the terminal 20C may determine that the resources are not available and exclude the resources from the available candidate resources.

Further, based on priority levels in SCI received from the terminal 20A and/or priority levels in SCI to be transmitted by the terminal 20C, the terminal 20C may determine whether the resources are available without excluding the resources from the available candidate resources.

As described above, the terminal 20 can use the resources not to be used and improve the use efficiency of resources by receiving information related to resources that are reserved but are not going to be used from another terminal 20.

The embodiments described above enable the terminal 20 to perform a resource selection operation based on information indicated by another terminal 20 and make it possible to lower the resource collision probability and improve the use efficiency of resources.

That is, the above embodiments make it possible to improve communication quality in the inter-terminal direct communication based on information indicated by another terminal.

(Apparatus Configurations)

Next, examples of functional configurations of the base station 10 and the terminal 20, which perform the above-describe processes and operations, are described. The base station 10 and the terminal 20 include functions for implementing the above-described embodiments. However, each of the base station 10 and the terminal 20 may include only some of the functions in the embodiments.

<Base Station 10>

Figure 21:
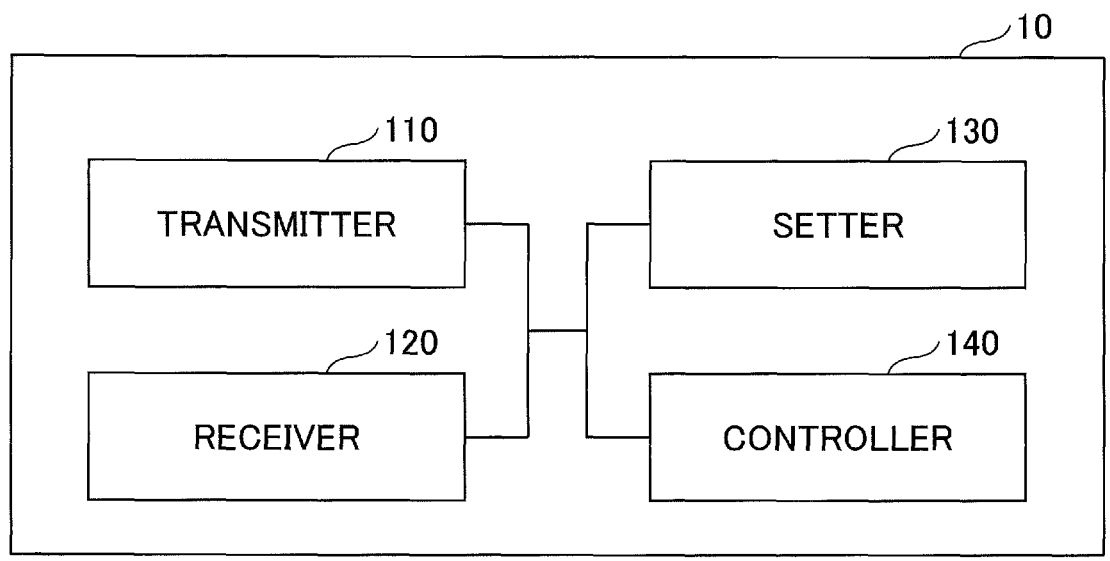
FIG. 21 is a drawing illustrating an example of a functional configuration of a base station 10 according to an embodiment of the present invention.

FIG. 21 is a drawing illustrating an example of a functional configuration of the base station 10. As illustrated in FIG. 21, the base station 10 includes a transmitter 110, a receiver 120, a setter 130, and a controller 140. The functional configuration illustrated in FIG. 21 is just an example. As long as operations related to the embodiments of the present invention can be performed, the categorization and the names of the functional components may be freely changed.

The transmitter 110 includes a function to generate a signal to be transmitted to the terminal 20 and to wirelessly transmit the signal. The receiver 120 includes a function to receive various types of signals transmitted from the terminal 20 and to obtain, for example, information on upper layers from the received signals. The transmitter 110 includes a function to transmit, for example, NR-PSS, NR-SSS, NR-PBCH, a DL/UL control signal, and a DL reference signal to the terminal 20.

The setter 130 stores, in a storage device, preset configuration information and various types of configuration information to be transmitted to the terminal 20, and reads the configuration information from the storage device as necessary. The configuration information may include, for example, configurations for D2D communication.

As explained in the embodiments, the controller 140 performs processes related to configurations used by the terminal 20 to perform D2D communications. Also, the controller 140 transmits scheduling for D2D communication and DL communication to the terminal 20 via the transmitter 110. Further, the controller 140 receives information on HARQ responses in D2D communication and DL communication from the terminal 20 via the receiver 120. A functional component of the controller 140 for signal transmission may be included in the transmitter 110, and a functional component of the controller 140 for signal reception may be included in the receiver 120.

<Terminal 20>

Figure 22:
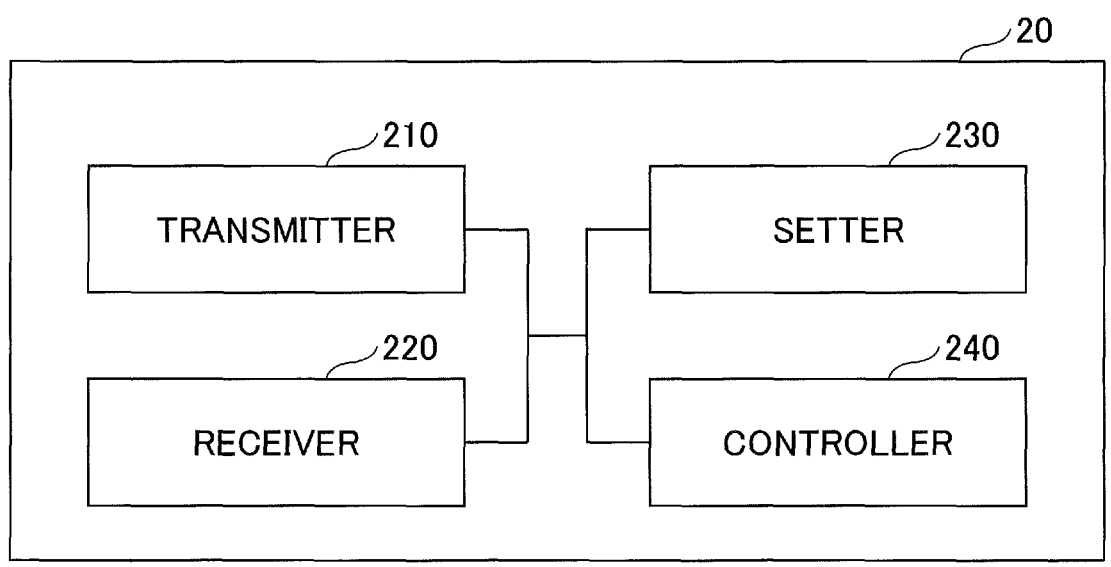
FIG. 22 is a drawing illustrating an example of a functional configuration of a terminal 20 according to an embodiment of the present invention.

FIG. 22 is a drawing illustrating an example of a functional configuration of the terminal 20. As illustrated in FIG. 22, the terminal 20 includes a transmitter 210, a receiver 220, a setter 230, and a controller 240. The functional configuration illustrated in FIG. 22 is just an example. As long as operations related to the embodiments of the present invention can be performed, the categorization and the names of the functional components may be freely changed.

The transmitter 210 generates a transmission signal from transmission data and wirelessly transmits the transmission signal. The receiver 220 wirelessly receives various types of signals, and obtains upper layer signals from received physical layer signals. Also, the receiver 220 includes a function to receive, for example, NR-PSS, NR-SSS, NR-PBCH, a DL/UL/SL control signal, and a reference signal transmitted from the base station 10. Also, for example, as D2D communications, the transmitter 210 transmits, to another terminal 20, a physical sidelink control channel (PSCCH), a physical sidelink shared channel (PSSCH), a physical sidelink discovery channel (PSDCH), and a physical sidelink broadcast channel (PSBCH); and the receiver 220 receives, for example, PSCCH, PSSCH, PSDCH, and PSBCH from another terminal 20.

The setter 230 stores various types of configuration information received from the base station 10 or the terminal 20 by the receiver 220 in a storage device, and reads the configuration information from the storage device as necessary. The setter 230 also stores preset configuration information. The configuration information may include, for example, configurations for D2D communication.

As described in the embodiments, the controller 240 controls D2D communications with other terminals 20. Also, the controller 240 performs processes related to HARQ in D2D communication and DL communication. Further, the controller 240 transmits, to the base station 10, information related to HARQ responses in D2D communication with another terminal 20 and DL communication that are scheduled by the base station 10. The controller 240 may also schedule D2D communication of another terminal 20. The controller 240 may autonomously select resources to be used for D2D communication from a resource selection window based on a sensing result. Further, the controller 240 performs processes related to PSBCH transmission and reception in D2D communication. A functional component of the controller 240 related to signal transmission may be included in the transmitter 210, and a functional component of the controller 240 related to signal reception may be included in the receiver 220.

(Hardware Configuration)

The block diagrams (FIG. 21 and FIG. 22) used in the descriptions of the above embodiments illustrate functional blocks. These functional blocks (components) are implemented by any combination of hardware and/or software. Also, each functional block may be implemented in any manner. That is, each functional block may be implemented by using one apparatus that is physically or logically integrated, or by using two or more apparatuses that are physically or logically separated from each other but are directly or indirectly connected to each other (e.g., via wired and/or wireless connections). Each functional block may also be implemented by combining the one apparatus or the two or more apparatuses with software.

Examples of functions include, but are not limited to, determining, deciding, judging, calculating, computing, processing, deriving, investigating, searching, confirming, receiving, transmitting, outputting, accessing, solving, selecting, adopting, establishing, comparing, assuming, expecting, presuming, broadcasting, notifying, communicating, forwarding, configuring, reconfiguring, allocating, mapping, and assigning. For example, a functional block (or functional component) for transmitting may be referred to as a transmitting unit or a transmitter. As described above, the functional block may be implemented in any appropriate manner.

Figure 23:
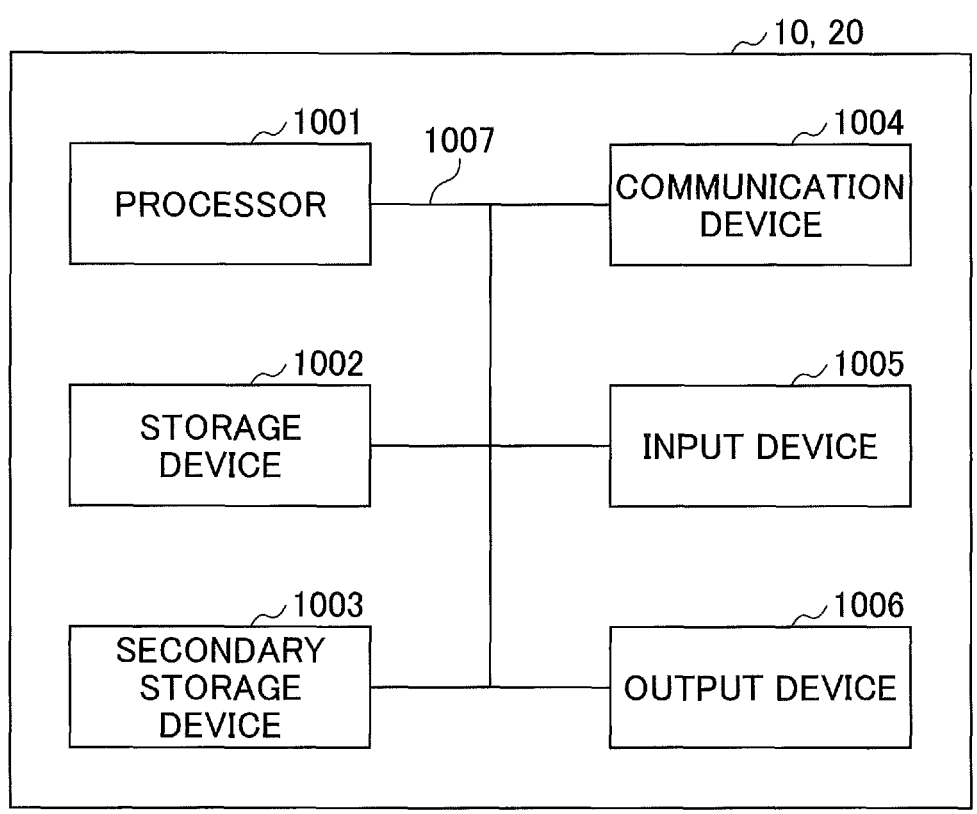
FIG. 23 is a drawing illustrating an example of a hardware configuration of a base station 10 or a terminal 20 according to an embodiment of the present invention.

For example, each of the base station 10 and the terminal 20 according to the embodiments of this disclosure may function as a computer that performs a radio communication method of this disclosure. FIG. 23 is a drawing illustrating an example of a hardware configuration of each of the base station 10 and the terminal 20 according to an embodiment of this disclosure. Physically, each of the base station 10 and the terminal 20 may be implemented as a computer including a processor 1001, a storage device 1002, a secondary storage device 1003, a communication device 1004, an input device 1005, an output device 1006, and a bus 1007.

In the descriptions below, the term "device" may indicate, for example, a circuit, an apparatus, or a unit. The hardware configuration of each of the base station 10 and the terminal 20 may include one or more sets of each device illustrated in the drawing, or may not include some of the devices.

Each function of the base station 10 and the terminal 20 may be implemented by loading predetermined software (program) onto a hardware component such as the processor 1001 or the storage device 1002, and thereby causing the processor 1001 to perform calculations, control communications performed by the communication device 1004, and control at least one of writing and reading of data to or from the storage device 1002 and the secondary storage device 1003.

The processor 1001, for example, runs an operating system to control the entire computer. The processor 1001 may be implemented by a central processing unit (CPU) that includes interfaces with peripheral devices, a controller, an arithmetic unit, and registers. For example, the controller 140 and the controller 240 may be implemented by the processor 1001.

The processor 1001 loads programs (program code), software modules, and data from the secondary storage device 1003 and/or the communication device 1004 onto the storage device 1002, and performs various processes according to the loaded programs, software modules, and data. The programs cause the computer to perform at least some of the operations described in the above embodiments. For example, the controller 140 of the base station 10 illustrated in FIG. 21 may be implemented by a control program that is stored in the storage device 1002 and executed by the processor 1001. Also, for example, the controller 240 of the terminal 20 illustrated in FIG. 22 may be implemented by a control program that is stored in the storage device 1002 and executed by the processor 1001. The processes described above may be performed by one processor 1001 or may be performed concurrently or sequentially by two or more processors 1001. The processor 1001 may be implemented by one or more chips. The programs may be received from a network via a telecommunication line.

The storage device 1002 is a computer-readable storage medium and may be implemented by, for example, at least one of a read-only memory (ROM), an erasable programmable ROM (EPROM), an electrically-erasable programmable ROM (EEPROM), and a random access memory (RAM). The storage device 1002 may also be referred to as a register, a cache, or a main memory. The storage device 1002 can store, for example, programs (program code) and software modules that are executable to perform communication methods according to the embodiments of this disclosure.

The secondary storage device 1003 is a computer-readable storage medium and may be implemented by, for example, at least one of an optical disk such as a compact-disk ROM (CD-ROM), a hard disk drive, a flexible disk, a magneto-optical disk (e.g., a compact disk, a digital versatile disk, or a Blu-ray (registered trademark) disk), a smart card, a flash memory (e.g., a card drive, a stick drive, or a key drive), a floppy (registered trademark) disk, and a magnetic strip. The storage medium described above may also be implemented by any other appropriate medium such as a database or a server that includes at least one of the storage device 1002 and the secondary storage device 1003.

The communication device 1004 is a hardware component (transceiver device) for communicating with other computers via at least one of a wired network and a wireless network. The communication device 1004 may also be referred to as a network device, a network controller, a network card, or a communication module. The communication device 1004 may include a high-frequency switch, a duplexer, a filter, and a frequency synthesizer to achieve at least one of frequency division duplex (FDD) and time division duplex (TDD). For example, a transmitting and receiving antenna, an amplifier, a transceiver, and a transmission line interface may be implemented by the communication device 1004. The transceiver may be physically or logically separated into a transmitter and a receiver.

The input device 1005 receives external inputs and may be implemented by, for example, a keyboard, a mouse, a microphone, switches, buttons, and sensors. The output device 1006 is an external output device (e.g., a display, a speaker, and/or an LED lamp). The input device 1005 and the output device 1006 may be implemented as a single component (e.g., a touch panel).

The above-described devices including the processor 1001 and the storage device 1002 are connected to each other via a bus 1007 for communication. The bus 1007 may be implemented by a single bus, or may be implemented by multiple buses connecting the corresponding devices.

Each of the base station 10 and the terminal 20 may include hardware components such as a microprocessor, a digital signal processor (DSP), an application specific integrated circuit (ASIC), a programmable logic device (PLD), and a field programmable gate array (FPGA); and some or all of the functional blocks may be implemented by these hardware components.

For example, the processor 1001 may be implemented by at least one of these hardware components.

(Summary of Embodiment)

As described above, an embodiment of the present invention provides a terminal including a receiver that receives, from another terminal, information that is related to inter-terminal direct communication and is for identifying available resources; a controller that identifies candidate resources and selects a resource to be used based on the information; and a transmitter that performs transmission in the inter-terminal direct communication using the selected resource.

With the above configuration, the terminal 20 can perform a resource selection operation based on the information indicated by another terminal 20, reduce the probability of resource collision, and improve the use efficiency of resources. That is, the above configuration makes it possible to improve communication quality in the inter-terminal direct communication based on information indicated by another terminal.

The information may be information related to transmission power reduction resulting from in-device coexistence. With this configuration, the terminal 20 can perform a resource selection operation based on the information indicated by another terminal 20 and improve the use efficiency of resources.

The controller may determine that resources to which the transmission power reduction is applied are available based on the information related to the transmission power reduction resulting from the in-device coexistence. With this configuration, the terminal 20 can perform a resource selection operation based on the information indicated by another terminal 20 and improve the use efficiency of resources.

The information may be information related to resources not to be used among reserved resources. With this configuration, the terminal 20 can perform a resource selection operation based on the information indicated by another terminal 20 and improve the use efficiency of resources.

The controller may determine that the resources not to be used are available based on the information related to the resources not to be used among the reserved resources. With this configuration, the terminal 20 can perform a resource selection operation based on the information indicated by another terminal 20 and improve the use efficiency of resources.

Also, an embodiment of the present invention provides a communication method performed by a terminal. The communication method includes receiving, from another terminal, information that is related to inter-terminal direct communication and is for identifying available resources; identifying candidate resources and selecting a resource to be used based on the information; and performing transmission in the inter-terminal direct communication using the selected resource.

With the above configuration, the terminal 20 can perform a resource selection operation based on the information indicated by another terminal 20, reduce the probability of resource collision, and improve the use efficiency of resources. That is, the above configuration makes it possible to improve communication quality in the inter-terminal direct communication based on information indicated by another terminal.

<Supplementary Description of Embodiments>

Embodiments of the present invention are described above. However, the present invention is not limited to the above-described embodiments, and a person skilled in the art may understand that variations, modifications, and replacements may be made to the above embodiments. Although specific values are used in the above descriptions to facilitate the understanding of the present invention, the values are just examples and other appropriate values may also be used unless otherwise mentioned. Grouping of subject matter in the above descriptions is not essential for the present invention. For example, subject matter described in two or more sections may be combined as necessary, and subject matter described in one section may be applied to subject matter described in another section unless they contradict each other. Boundaries of functional units or processing units in functional block diagrams do not necessarily correspond to boundaries of physical components. Operations of multiple functional units may be performed by one physical component, and an operation of one functional unit may be performed by multiple physical components. The order of steps in processes described in the embodiments may be changed as long as the consistency of the steps is maintained. Although functional block diagrams are used to describe the base station 10 and the terminal 20, each of the base station 10 and the terminal 20 may be implemented by hardware, software, or a combination of them. Each of software to be executed by a processor of the base station 10 according to the embodiments of the present invention and software to be executed by a processor of the terminal 20 according to the embodiments of the present invention may be stored in any appropriate storage medium such as a random access memory (RAM), a flash memory, a read-only memory (ROM), an EPROM, an EEPROM, a register, a hard disk drive (HDD), a removable disk, a CD-ROM, a database, or a server.

Information may also be indicated using methods other than those described in the above embodiments. For example, information may be indicated by physical layer signaling (for example, downlink control information (DCI) or uplink control information (UCI)), upper layer signaling (for example, radio resource control (RRC) signaling, medium access control (MAC) signaling, radio link control (RLC) signaling, packet data convergence protocol (PDCP) signaling, broadcast information (master information block (MIB) or system information block (SIB)), any other signal, or a combination of them. Also, RRC signaling may be referred to as an RRC message and may be, for example, an RRC connection setup message or an RRC connection reconfiguration message. Also, information may be indicated using any channel such as PSCCH, PSSCH, PSFCH, or PSBCH.

The embodiments described in this disclosure may be applied to at least one of systems employing LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-Wideband), Bluetooth (registered trademark), and any other appropriate system, and a next generation system implemented by extending any one of these systems. Also, the above embodiments may be applied to a combination of multiple systems (e.g., a combination of at least one of LTE and LTE-A and 5G).

The order of steps in sequence charts and flowcharts described in the embodiments may be changed as long as the consistency of the steps is maintained. For example, the order of steps in a method described in the above embodiments is an example and may be changed to any appropriate order.

Specific operations performed by the base station 10 in the present application may be performed by an upper node of the base station 10. In a network comprised of one or more network nodes including the base station 10, various operations performed for communication with the terminal 20 may be performed by at least one of the base station 10 and a network node (which is, for example, but is not limited to, MME or S-GW) other than the base station 10. In the above example, there is one network node other than the base station 10. However, there may be two or more types of network nodes (e.g., MME and S-GW) other than the base station 10.

Information or signals described in this disclosure may be output from an upper layer (or a lower layer) to the lower layer (or the upper layer), and may be input and output via multiple network nodes.

Input/output information may be stored in a specific location (e.g., in a memory), or may be managed using a management table. Input/output information may be overwritten, updated, or added. Output information may be removed. Input information may be transmitted to another apparatus.

In the present application, decision may be made based on a one-bit value (0 or 1) or a truth value (Boolean: true or false), or by comparison of values (e.g., comparison with a predetermined value).

Regardless of whether software is called software, firmware, middleware, a microcode, a hardware description language, or by any other name, software can be interpreted widely to mean a command, a command set, a code, a code segment, a program code, a program, a subprogram, a software module, an application, a software application, a software package, a routine, a subroutine, an object, an executable file, an execution thread, a procedure, or a function.

Also, software, commands, and information may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a wireless technology such as infrared rays or a microwave, at least one of the wired technology and the wireless technology technology is within the definition of the transmission medium.

Information and signals described in the present application may be represented by using various different technologies. For example, data, instructions, commands, information, signals, bits, symbols, and chips in the above descriptions may be represented by voltages, electric currents, electromagnetic waves, magnetic fields, magnetic particles, optical fields, photons, or any combination of them.

Terms described in the present application and terms necessary to understand the present application may be replaced with terms having the same or similar meanings. For example, a channel and/or a symbol may be replaced with a signal (signaling). Also, a signal may be replaced with a message. A component carrier (CC) may be referred to as a carrier frequency, a cell, or a frequency carrier.

In the present application, the terms "system" and "network" may be used interchangeably.

Also, information and parameters described in the present application may be represented by absolute values, may be represented by relative values relative to predetermined values, or may be represented by other types of information. For example, radio resources may be indicated by indices.

The names used for the above-described parameters are not exclusive names. Also, formulas using those parameters are not limited to those disclosed in the present application. Various channels (e.g., PUCCH and PDCCH) and information elements may be identified by any appropriate names. Accordingly, the names assigned to the channels and the information elements do not limit the channels and the information elements in any respect.

In the present application, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell,", "sector", "cell group", "carrier", and "component carrier" may be used interchangeably. The base station may also be referred to as a macro cell, a small cell, a Femto cell, or a pico cell.

The base station can accommodate one or more (for example, three) cells. When the base station accommodates multiple cells, the entire coverage area of the base station may be divided into multiple smaller areas, and each of the smaller areas may provide a communication service through a base station subsystem (for example, a small indoor base station (RRH: remote radio head). The term "cell" or "sector" refers to a part or the entirety of the coverage area of at least one of the base station and the base station subsystem that provides a communication service in this coverage.

In the present application, the terms "mobile station (MS)", "user terminal", "user equipment UE", and "terminal" may be used interchangeably.

Depending on persons skilled in the art, the mobile station may be called by any other appropriate term such as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client.

At least one of the base station and the mobile station may be referred to as a transmission apparatus, a reception apparatus, or a communication apparatus. At least one of the base station and the mobile station may be a device mounted on a mobile body or the mobile body itself. The mobile body may be a vehicle (e.g., automobile or aircraft), an unmanned mobile body (e.g., drone or self-guided vehicle), or a robot (manned or unmanned). At least one of the base station and the mobile station may be an apparatus that does not move during communications. For example, at least one of the base station and the mobile station may be an Internet of Things (IoT) device such as a sensor.

Also, the base station in the present application may be replaced with a user terminal. For example, embodiments of the present invention may be applied to a configuration where communications between the base station and the user terminal are replaced with communications (e.g., device-to-device (D2D) or vehicle-to-Everything (V2X) communications) between multiple terminals 20. In this case, the terminal 20 may include functions of the base station 10. Also, terms such as "uplink" and "downlink" may be replaced with a term such as "side" used in inter-terminal communications. For example, an uplink channel and a downlink channel may be replaced with side channels.

Similarly, the user terminal in the present application may be replaced with a base station. In this case, the base station may have the functions of the user terminal.

In the present application, the term "determining" may indicate various operations. For example, "determining" may indicate that one of "judging", "calculating", "computing", "processing", "deriving", "investigating", "looking up (searching, inquiring)" (e.g., searching a data structure such as a table or a database), and "ascertaining" has been performed. Also, "determining" may indicate that one of "receiving" (e.g., reception of information), "transmitting" (e.g., transmission of information), "inputting", "outputting", and "accessing" (e.g., accessing data in a memory) has been performed. Further, "determining" may indicate that one of "resolving", "selecting", "choosing", "establishing", and "comparing" has been performed. Thus, "determining" may indicate that an operation has been performed. Also, "determining" may be replaced with a term such as "assuming", "expecting", or "considering".

Terms "connected", "coupled", or variations thereof means any direct or indirect connection or coupling between two or more elements and may include the presence of one or more intermediate elements between two elements which are "connected" or "coupled". The coupling or the connection between the elements may be physical, logical, or a combination thereof. For example, "connecting" may be replaced with "accessing". When used in this application, two elements may be considered to be "connected" or "coupled" with each other using one or more electric wires, cables, and/or a printed electrical connection or using electromagnetic energy having a wavelength in a radio frequency region, a microwave region, or an optical (both visible and invisible) region as non-limiting and non-comprehensive examples.

A reference signal may be abbreviated as RS and may be referred to as a pilot depending on a standard to be applied.

In the present application, "based on" does not mean "based only on" unless otherwise mentioned. In other words, "based on" can mean both "based only on" and "based at least on".

In the present application, terms such as "first" and "second" used to refer to elements do not generally indicate the quantity or the order of those elements. In the present application, such terms may be used to distinguish two or more elements from each other. Accordingly, a first element and a second element do not necessarily indicate that there are only two elements and that the first element needs to come before the second element.

Components in the apparatuses described above may also be referred to as "units", "parts", "circuits", or "devices".

In the present application, similarly to the term "comprising", the terms "include" and "including" and variations thereof are open-ended terms. Also, in the present application, the term "or" does not indicate exclusive OR.

A radio frame may be composed of one or more frames in the time domain. In the time domain, one or more frames may be referred to as subframes. Also, a subframe may be composed of one or more slots in the time domain. A subframe may have a fixed time length (for example, 1 ms) that does not depend on numerology.

Numerology may be a communication parameter applied to at least one of transmission and reception of a signal or a channel. Numerology may indicate, for example, at least one of a subcarrier spacing (SCS), a bandwidth, a symbol length, a cyclic prefix length, a transmission time interval (TTI), a number of symbols per TTI, a radio frame configuration, a specific filtering process performed by a transceiver in the frequency domain, and a specific windowing process performed by a transceiver in the time domain.

A slot may be composed of one or more symbols (e.g., orthogonal frequency division multiplexing (OFDM) symbols, or single carrier frequency division multiple access (SC-FDMA) symbols) in the time domain. A slot may be a time unit based on numerology.

A slot may include multiple minislots. Each minislot may be composed of one or more symbols in the time domain. Also, a minislot may be referred to as a "subslot". A minislot may consist of a smaller number of symbols than a slot. PDSCH (or PUSCH) transmitted in a time unit greater than a minislot may be referred to as "PDSCH (or PUSCH) mapping type A". PDSCH (or PUSCH) transmitted using a minislot may be referred to as "PDSCH (or PUSCH) mapping type B".

Each of a radio frame, a subframe, a slot, a minislot, and a symbol indicates a time unit in transmitting a signal. Each of a radio frame, a subframe, a slot, a minislot, and a symbol may be referred to by a different name.

For example, one subframe may be referred to as a transmission time interval (TTI), multiple consecutive subframes may be referred to as a TTI, and one slot or one minislot may be referred to as a TTI. That is, at least one of a subframe and a TTI may correspond to a subframe (1 ms) in the existing LTE, a period shorter than 1 ms (e.g., 1 through 13 symbols), or a period longer than 1 ms. Here, a unit representing a TTI may be referred to as a slot or a minislot instead of a subframe.

Here, a TTI may indicate, for example, the minimum time unit of scheduling in radio communications. For example, in the LTE system, the base station performs scheduling by allocating radio resources (e.g., a frequency bandwidth and transmission power available for each terminal 20) to each terminal 20 in units of TTIs. The definition of TTI is not limited to this example.

For example, TTI may be used as a transmission time unit for a channel-encoded data packet (transport block), a code block, or a code word; or used as a processing unit for scheduling or link adaptation. When a TTI is allocated, a time period (e.g., the number of symbols) to which, for example, a transport block, a code block, or a code word is actually mapped may be shorter than the TTI.

When one slot or one minislot is referred to as a TTI, one or more TTIs (i.e., one or more slots or one or more minislots) may be used as the minimum time unit of scheduling. Also, the number of slots (or the number of minislots) constituting the minimum time unit of scheduling may be controlled.

A TTI having a time length of 1 ms may be referred to, for example, as a general TTI (TTI in LTE Rel. 8-12), a normal TTI, a long TTI, a general subframe, a normal subframe, a long subframe, or a slot. A TTI shorter than the general TTI may be referred to, for example, as a shortened TTI, a short TTI, a partial or fractional TTI, a shortened subframe, a short subframe, a minislot, a subslot, or a slot.

A long TTI (e.g., a general TTI or a subframe) may be referred to as a TTI having a time length greater than 1 ms, and a short TTI (e.g., a shortened TTI) may be referred to as a TTI having a TTI length that is less than the TTI length of the long TTI and greater than or equal to 1 ms.

A resource block (RB) is a resource allocation unit in the time domain and the frequency domain, and may include one or more consecutive subcarriers in the frequency domain. An RB may include the same number of subcarriers, e.g., 12, regardless of numerology. Alternatively, the number of subcarriers included in an RB may be determined based on numerology.

Also, in the time domain, an RB may include one or more symbols, and may have a length of one slot, one minislot, one subframe, or one TTI. Each of one TTI and one subframe may be comprised of one or more resource blocks.

One or more RBs may be referred to as a physical resource block (PRB), a subcarrier group (SCG), a resource element group (REG), a PRB pair, or an RB pair.

Also, a resource block may be comprised of one or more resource elements (RE). For example, one RE may be a radio resource region consisting of one subcarrier and one symbol.

A bandwidth part (BWP) (which may also be referred to as a partial bandwidth) may indicate a subset of consecutive common resource blocks (RB) for a numerology in a carrier. Here, the common RB may be identified by an RB index relative to a common reference point of the carrier. A PRB may be defined by a BWP and numbered within the BWP.

A BWP may include an uplink BWP (UL BWP) and a downlink BWP (DL BWP). One or more BWPs may be set in one carrier for the terminal 20.

At least one of the set BWPs may be active, and the terminal 20 does not have to expect transmitting and receiving a predetermined signal/channel outside of the active BWP. A "cell" or a "carrier" in this disclosure may be referred to as a "BWP".

The above-described configurations of a radio frame, a subframe, a slot, a minislot, and a symbol are just examples. For example, the number of subframes in a radio frame, the number of slots per subframe or radio frame, the number of minislots in a slot, the numbers of symbols and RBs in a slot or a minislot, the number of subcarriers in an RB, the number of symbols in a TTI, a symbol length, and a cyclic prefix (CP) length may be changed in various manners.

When an article "a", "an", or "the" is attached to a noun in the English translation of the present application, the noun following the article may indicate plural elements.

In this disclosure, "A and B differ" may indicate that "A and B differ from each other" or "A and B differ from C". This also applies to terms such as "separate" and "couple".

The above-described embodiments may be used separately or in any combination, and may also be switched during a process. Predetermined information (e.g., "A is X") may be indicated explicitly or implicitly (e.g., by not indicating the predetermined information).

Embodiments of the present invention are described above. However, the present invention is not limited to the above-described embodiments, and a person skilled in the art may understand that variations, modifications, and replacements may be made without departing from the scope of the present invention. Thus, the above-described embodiments are examples and are not intended to limit the present invention.

EXPLANATION OF REFERENCE NUMERALS 10 base station
110 transmitter
120 receiver
130 setter
140 controller
20 terminal
210 transmitter
220 receiver
230 setter
240 controller
30 GNSS
1001 processor
1002 storage device
1003 secondary storage device
1004 communication device
1005 input device
1006 output device

The invention claimed is:
1. A terminal comprising:
a receiver that receives, from a first terminal, control information via a control channel; and
a transmitter that transmits, to a second terminal, information for avoiding a collision between a first resource and a second resource,
wherein the first resource is indicated by the control information and used by the first terminal for transmission of a shared channel,
wherein the second resource is used by the second terminal for transmission of the shared channel, wherein the transmitter transmits, to the second terminal, the information for avoiding the collision in a transmission opportunity for a feedback channel corresponding to a reception slot of the control information via the control channel, and wherein the transmitter transmits, to the second terminal, the information for avoiding the collision in a transmission opportunity for a feedback channel corresponding to the first resource indicated by the control information.

2. A communication method performed by a terminal, the communication method comprising:

receiving, from a first terminal, control information via a control channel; and transmitting, to a second terminal, information for avoiding a collision between a first resource and a second resource, wherein the first resource is indicated by the control information and used by the first terminal for transmission of a shared channel, wherein the second resource is used by the second terminal for transmission of the shared channel, wherein the transmitting transmits, to the second terminal, the information for avoiding the collision in a transmission opportunity for a feedback channel corresponding to a reception slot of the control information via the control channel, and wherein the information for avoiding the collision is transmitted, to the second terminal, in a transmission opportunity for a feedback channel corresponding to the first resource indicated by the control information.

* * * * *